(12) United States Patent
Takai

(10) Patent No.: US 9,019,515 B2
(45) Date of Patent: Apr. 28, 2015

(54) DISPLAY INPUT DEVICE HAVING A PROGRAM FUNCTION, IMAGE FORMING APPARATUS HAVING A PROGRAM FUNCTION, AND DISPLAY METHOD FOR DISPLAY INPUT DEVICE HAVING A PROGRAM FUNCTION

(75) Inventor: Kenji Takai, Osaka (JP)

(73) Assignee: Kyocera Document Solutions Inc., Osaka (JP)

( * ) Notice: Subject to any disclaimer, the term of this patent is extended or adjusted under 35 U.S.C. 154(b) by 562 days.

(21) Appl. No.: 13/234,731

(22) Filed: Sep. 16, 2011

(65) Prior Publication Data

US 2012/0075653 A1   Mar. 29, 2012

(30) Foreign Application Priority Data

Sep. 28, 2010   (JP) ................................ 2010-217979

(51) Int. Cl.
　　*G06F 3/12*　　(2006.01)
　　*G06K 15/00*　　(2006.01)
　　*G03G 15/00*　　(2006.01)
　　*H04N 1/00*　　(2006.01)

(52) U.S. Cl.
　　CPC ......... *G03G 15/502* (2013.01); *H04N 1/00416* (2013.01); *H04N 1/00432* (2013.01); *H04N 1/00474* (2013.01); *H04N 1/00482* (2013.01); *H04N 1/00501* (2013.01); *H04N 2201/0094* (2013.01)

(58) Field of Classification Search
　　USPC ........................................................ 358/1.15
　　See application file for complete search history.

(56) References Cited

U.S. PATENT DOCUMENTS

| 2005/0097171 A1 | 5/2005 | Hikichi | |
| 2005/0129245 A1* | 6/2005 | Takaoka | 380/277 |
| 2008/0289051 A1* | 11/2008 | Osamura et al. | 726/28 |
| 2012/0079604 A1 | 3/2012 | Hikichi | |

FOREIGN PATENT DOCUMENTS

| CN | 1870076 A | 11/2006 |
| JP | 2005-158038 | 6/2005 |
| JP | 2006-27043 | 2/2006 |
| JP | 2006-41598 A | 2/2006 |
| JP | 2008-9291 A | 1/2008 |

OTHER PUBLICATIONS

Chinese Office Action for Application No. 201110254771.X dated on Sep. 10, 2013.

* cited by examiner

*Primary Examiner* — Huo Long Chen
(74) *Attorney, Agent, or Firm* — Smith, Gambrell & Russell LLP

(57) ABSTRACT

Provided is a display input device including a display portion for displaying a screen for setting a function, a storage portion for storing a program to be invoked and used, and an input portion for receiving inputs of selection of the function and setting of a setting value of the selected function and inputs of registration of the program and invocation of the program, and the display portion performs such security protected display as to inhibit a predefined part of contents of the registered program from being displayed as registered.

14 Claims, 14 Drawing Sheets

Fig.14

| SECURITY PROTECTION SUBJECT |
|---|
| abcdef, INC. ~D |
| quotation |
| YYYY |
| (925) 849-XXXX |
| (nnn) nnn-nnnn |
| .com |
| @ |
| user |
| STATEMENT OF ACCOUNTS |
| $ |
| ¥ |
| nnn |
| ⋮ |

DISPLAY INPUT DEVICE HAVING A PROGRAM FUNCTION, IMAGE FORMING APPARATUS HAVING A PROGRAM FUNCTION, AND DISPLAY METHOD FOR DISPLAY INPUT DEVICE HAVING A PROGRAM FUNCTION

This application is based upon and claims the benefit of priority from the corresponding Japanese Patent Application No. 2010-217979 filed on Sep. 28, 2010, the entire contents of which are incorporated herein by reference.

BACKGROUND OF THE INVENTION

1. Field of the Invention

The present invention relates to a display input device including a display portion and having a program function. The present invention also relates to an image forming apparatus including the display input device, such as a copier, a multifunction peripheral, a printer, or a fax machine.

2. Description of Related Art

In recent years, image forming apparatuses such as a copier, a multifunction peripheral, a printer, and a FAX machine come installed with a large number of functions, and an operation procedure for setting of printing or the like tends to become complicated. Therefore, there are devices that facilitate the setting performed on the image forming apparatus. For example, there is known an invention that devises a display method performed by a display operation portion.

For example, there is known an image forming apparatus including storage means for storing image data, an image forming portion for forming an image on paper based on the image data stored in the storage means, a display operation portion for presenting information to a user and receiving an operation and an instruction input from the user, and control means for performing such control as to allow a display name of a predetermined part being displayed to be changed in display performed by the display operation portion. With this configuration, operability is to be improved by, for example, changing a button name written on a button of the display operation portion according to an operator. Note that, it cannot be identified who operates the button, which actually necessitates a configuration for identifying a user based on a user name, a password, and the like that are input in order to change the button name according to the operator.

Here, setting contents (for example, selected one or a plurality of functions and setting values therefor) of the image forming apparatus may be allowed to be registered (stored) as a program so as to be able to easily shorten a time required for the setting (which is sometimes referred to as "program function"). Then, invoking the program (setting contents) leads to a state in which the setting contents (registered contents) of the program have been set. This allows the setting of a plurality of functions to be performed simultaneously at one step of invoking the program.

In addition, one image forming apparatus is installed per department or floor and shared. Accordingly, the program may be shared by a plurality of persons. However, setting values and a program name of the registered program may contain information to be protected in view of information security such as personal information and classified information. For example, in a case of a program involved in transmission of a document read by the image forming apparatus, the program often contains a name of a transmission destination and address information thereon. This raises a problem that there may be leakage of the information to be protected in view of information security when a person who is not registered uses a shared program.

Here, the above-mentioned known image forming apparatus is to enhance the operability in that the button name is changed according to the operator. However, this is not related to the sharing of the program. Further, in the case where the information to be protected in view of information security is contained in the button name, information leakage may occur.

SUMMARY OF THE INVENTION

The present invention has been made in view of the above-mentioned problem, and an object thereof is to automatically prevent leakage of information to be protected in view of information security in a case where a program is shared. Another object of the invention is to enhance safety in view of information security, promote program sharing, and enhance usability of a display input device.

In order to solve the above-mentioned problem, a display input device according to an aspect of the present invention includes: a storage portion for storing a program which includes data indicating a selected function and a setting value thereof and which is to be invoked and used; an input portion for receiving inputs of selection of a function and setting of the setting value of the selected function and inputs of registration of the program and invocation of the program; and a display portion for displaying a screen for setting the function of a device, and performing such security protected display as to inhibit a predefined part of contents of the registered program from being displayed as registered when the invoked program is displayed.

According to the present invention, the leakage of personal information or classified information from the shared program is automatically prevented, which can enhance the safety in view of information security. Further, it is possible to promote the program sharing and enhance the usability of the display input device and an image forming apparatus.

Further features and advantages of the present invention will become apparent from the description of embodiments given below.

BRIEF DESCRIPTION OF THE DRAWINGS

FIG. 14 is an explanatory diagram illustrating an example of data that defines protection subjects.

DETAILED DESCRIPTION OF PREFERRED EMBODIMENTS

Hereinbelow, embodiments of the present invention are described with reference to FIGS. 1 to 17. Description is given by taking as an example an Operation panel 1 (corresponding to a display input device) to be mounted to a multifunction peripheral 100 (corresponding to an image forming apparatus). Note that, such elements as configuration and layout described in this embodiment are provided merely by way of example, and not by way of limiting the scope of the present invention.

(Outline of the Multifunction Peripheral 100)

Figure 1:
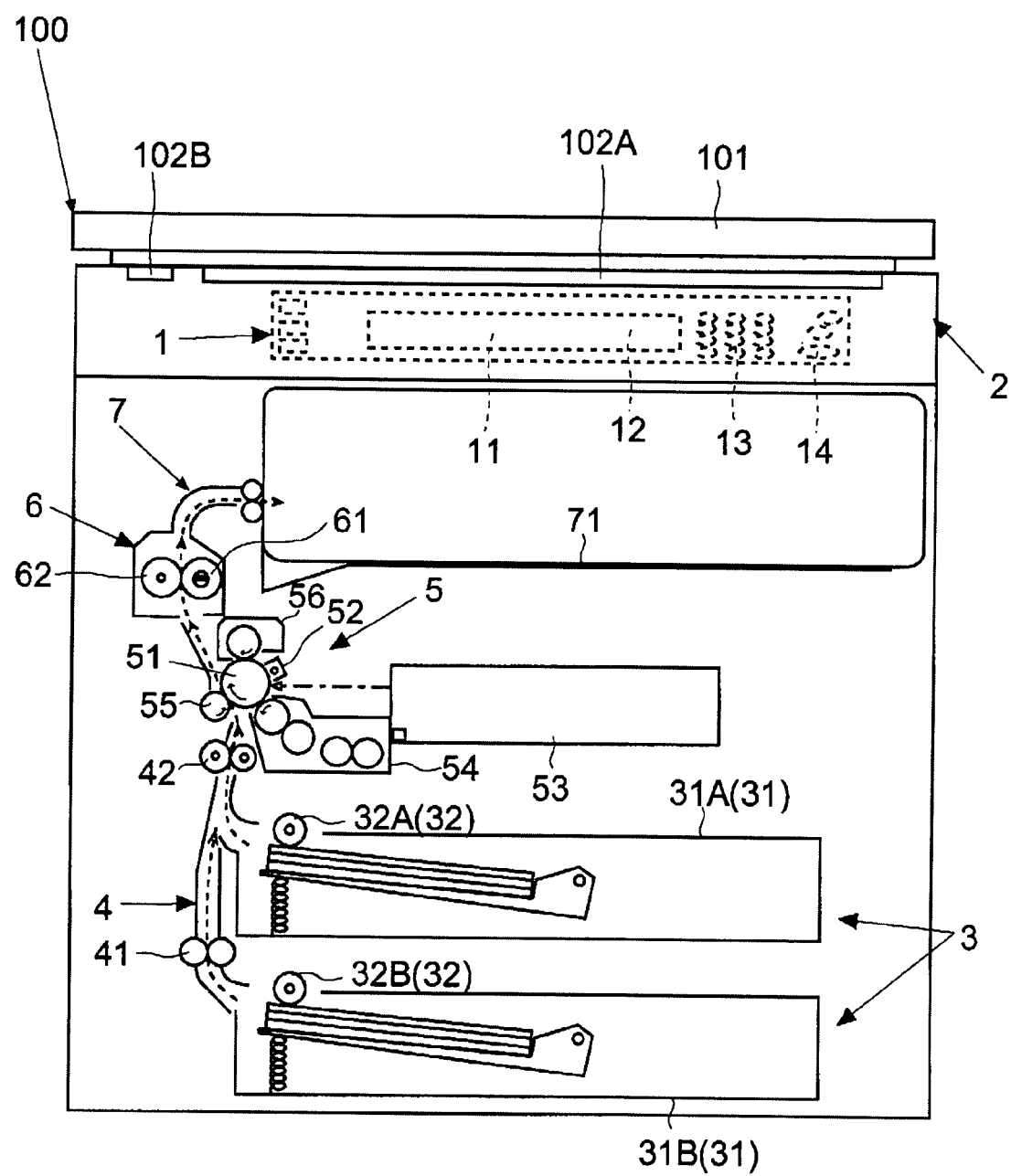
FIG. 1 is a sectional front view schematically illustrating an example of a multifunction peripheral.

First, referring to FIG. 1, the multifunction peripheral 100 according to the embodiment of the present invention is described. FIG. 1 is a sectional front view schematically illustrating an example of the multifunction peripheral 100.

As illustrated in FIG. 1, the multifunction peripheral 100 includes a document cover 101 at a top part thereof. A main body of the multifunction peripheral 100 includes the Operation panel 1 (details of which are described later), an image reading portion 2, a sheet feeding portion 3, a conveyance path 4, an image forming portion 5, a fixing portion 6, and a delivery conveyance portion 7.

First, the document cover 101 has a fulcrum in a position on a top surface and a back surface of the multifunction peripheral 100 so as to be free to swing open and closed vertically. In copying a document, the document cover 101 presses the placed document against a contact glass 102A for placement reading. Note that, a document conveying device for automatically and continuously feeding documents sheet by sheet to a reading position (contact glass 102B for feed reading) of the image reading portion 2 may be provided in place of the document cover 101.

The image reading portion 2 reads a document and forms image data on the document. Provided within the image reading portion 2 are optical system members (not shown) such as an exposure lamp, a mirror, a lens, and an image sensor (for example, CCD). Those optical system members are used to apply light to a document placed on the contact glass 102A for placement reading. Then, the image reading portion 2 A/D-converts an output value of each pixel of the image sensor that has received light reflected from the document, to thereby generate the image data. The multifunction peripheral 100 can perform printing based on the image data obtained by the reading (copy function). Further, the multifunction peripheral 100 can also transmit the image data obtained by the reading to an external portion (scan function and FAX function)

The sheet feeding portion 3 receives a plurality of sheets of paper (for example, copy paper, recycled paper, cardboard, and various sheets such as an OHP sheet). Then, the sheet feeding portion 3 feeds paper to the conveyance path 4 sheet by sheet. The sheet feeding portion 3 includes cassettes 31 in each of which a plurality of sheets of paper are placed (in FIG. 1, the upper one is denoted by symbol 31A and the lower one is denoted by symbol 31 B). Further provided are sheet feeding rollers 32 that are rotationally driven to feed paper from the cassette 31 to the conveyance path 4 (in FIG. 1, the upper one is denoted by symbol 32A and the lower one is denoted by symbol 32B). For example, in the printing, the sheet feeding roller 32 is rotationally driven to feed the paper to the conveyance path 4 sheet by sheet.

The conveyance path 4 is a path along which a sheet is conveyed from the sheet feeding portion 3 to a delivery tray 71. Note that, the image forming portion 5, the fixing portion 6, and the like are arranged along the conveyance path 4. Provided to the conveyance path 4 are a guide for guiding sheets, a conveyance roller pair 41 that are rotationally driven when a sheet is conveyed, a registration roller pair 42 for holding a conveyed sheet in front of the image forming portion 5 and feeding the sheet in synchronization with a timing at which a toner image is formed, and the like.

The image forming portion 5 forms a toner image based on the image data and transfers the toner image onto the conveyed sheet. The image forming portion 5 includes a photosensitive drum 51 supported so as to be rotationally driven in the arrow direction indicated in FIG. 1 and a charging device 52, an exposure device 53, a developing device 54, a transfer roller 55, a cleaning device 56, and the like that are arranged around the photosensitive drum 51.

Described below are processes for toner image formation and transfer. The photosensitive drum 51 that is provided substantially at the center of the image forming portion 5 and is rotationally driven in a predetermined direction is charged to a predetermined potential by the charging device 52. Based on the image data, the exposure device 53 outputs a laser beam, scans and exposes a front surface of the photosensitive drum 51, and forms an electrostatic latent image according to the image data. Note that, the image data to be used includes the image data obtained by the image reading portion 2 and the image data transmitted from an external computer 200 and a communication partner's FAX machine 300 that are connected via a network or the like (see FIG. 3).

Then, the developing device 54 develops the electrostatic latent image formed on the photosensitive drum 51 by supplying toner thereto. The transfer roller 55 is in pressure contact with the photosensitive drum 51 to form a nip. The sheet enters the nip in synchronization with the timing at which the toner image is formed. When the sheet enters, a predetermined voltage is applied to the transfer roller 55. This causes the toner image on the photosensitive drum 51 to be transferred onto the sheet. The cleaning device 56 removes toner remaining on the photosensitive drum 51 after the transfer.

The fixing portion 6 fixes the toner image that has been transferred onto the sheet. The fixing portion 6 according to this embodiment includes a heating roller 61 embedded with a heating element and a pressure roller 62. The heating roller 61 and the pressure roller 62 are in pressure contact with each other to form a nip therebetween. When the sheet passes through the nip, the toner on the front surface of the sheet is fused/heated. As a result, the toner image is fixed to the sheet. The delivery conveyance portion 7 conveys the printed sheet toward the direction of the delivery tray 71 and delivers the sheet thereto. Accordingly, image formation (printing) is performed when a copy function or a printer function is used.

(Operation Panel 1)

Figure 2:
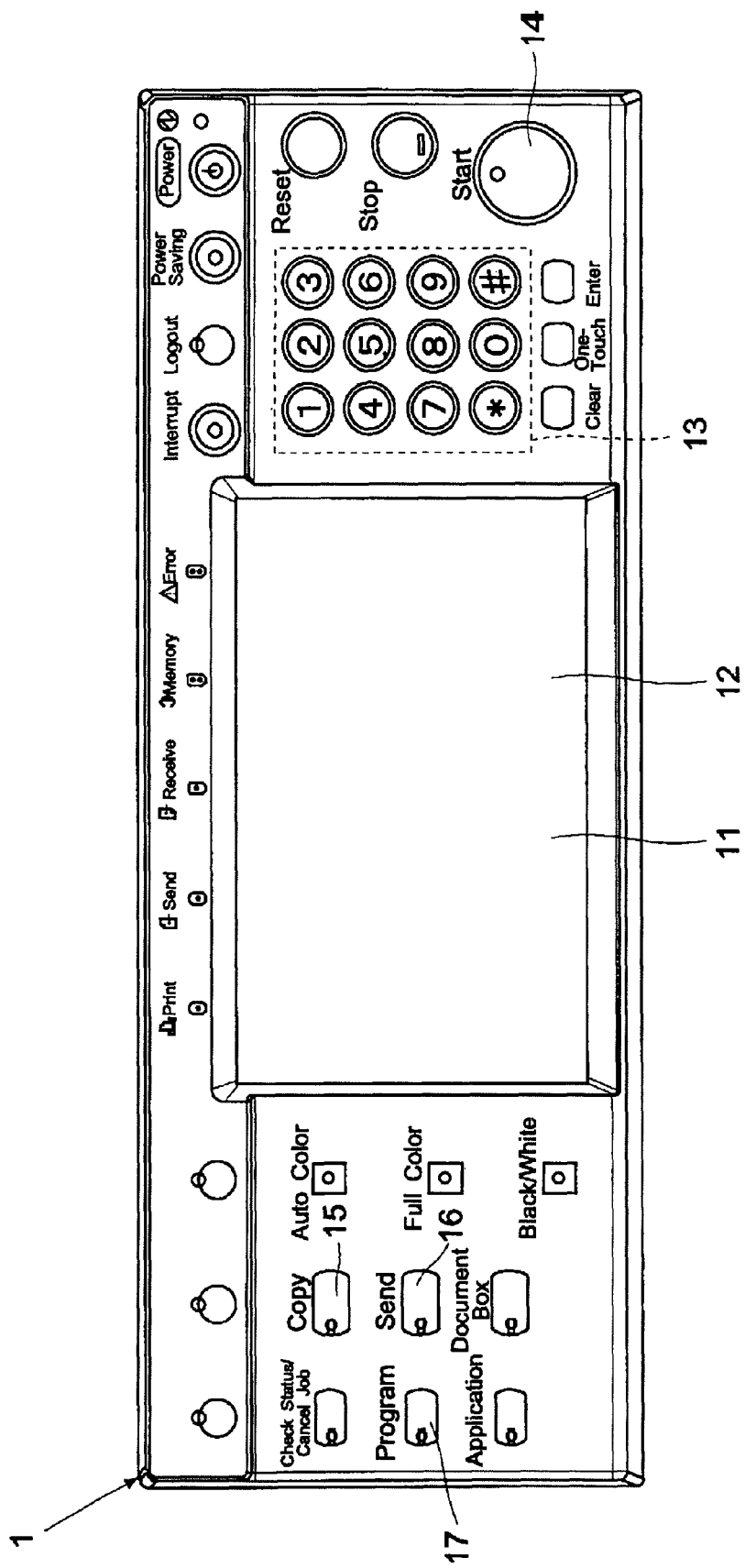
FIG. 2 is a plan view illustrating an example of an operation panel.

Next, referring to FIG. 2, description is given of an example of the Operation panel 1 according to the embodiment of the present invention. FIG. 2 is a plan view illustrating an example of the Operation panel 1.

As illustrated in FIG. 1, the Operation panel 1 is provided in the upper front of the multifunction peripheral 100. Further, the operation panel includes a liquid crystal display portion 11 (corresponding to display portion) for displaying a screen and various images, such as menus and keys used for making settings of the multifunction peripheral 100 and giving operation instructions, and a message regarding the state of the multifunction peripheral 100. A user can press the keys displayed on the liquid crystal display portion 11 to input various settings for the functions of the multifunction peripheral 100.

Further, a touch panel portion 12 (corresponding to input portion) is provided on the top surface of the liquid crystal display portion 11. The touch panel portion 12 is used for detecting the position and coordinates of a part pressed by the user on the liquid crystal display portion 11. By comparing the coordinates detected by the touch panel portion 12 to the positions and coordinates of various keys displayed on the liquid crystal display portion 11, the key selected by the user through pressing is identified. Note that, the touch panel portion 12 is not particularly limited, and thus can employ various types, such as a resistive type, a surface acoustic wave type, an infrared type, and a capacitive type.

Further, the Operation panel 1 is provided with the following hard keys (buttons). For example, there are provided a numeric keypad portion 13 for inputting numerals and a start key 14 for giving an instruction to start such processing as copying or sending. Further, there are provided, for example, a copy key 15 to be pressed when a copy function is used and a send key 16 to be pressed when a scanner function or a fax function is used. Further, there is also provided a program key 17 (corresponding to the input portion) to be pressed when a program is registered, or a program is invoked. As described above, the various hard keys also function as the input portion used for making various settings of setting values, selecting functions, and performing other operations with regard to respective functions of the multifunction peripheral 100.

(Hardware Configuration of the Multifunction Peripheral 100)

Figure 3:
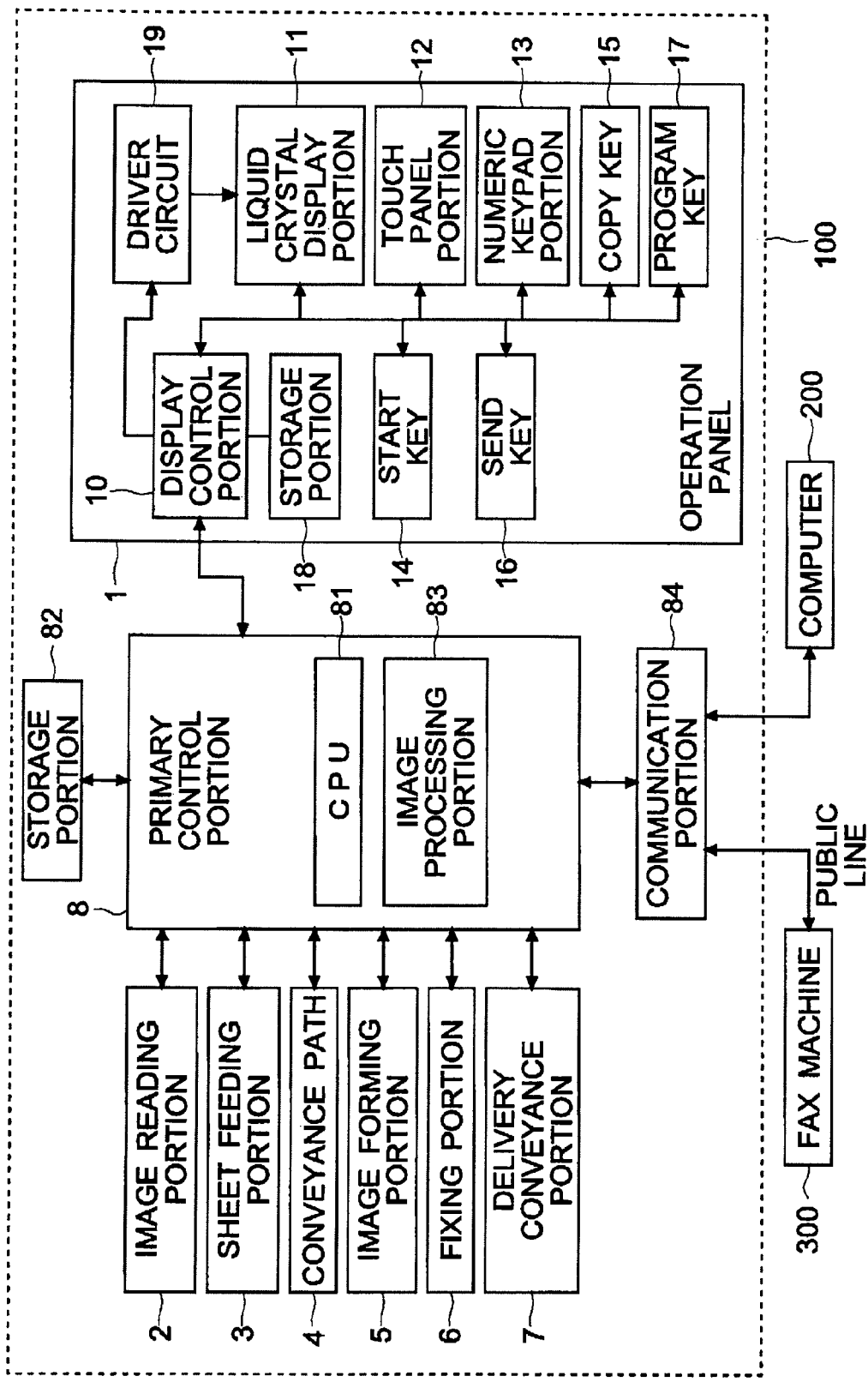
FIG. 3 is a block diagram illustrating an example of a hardware configuration of the multifunction peripheral.

Next, referring to FIG. 3, description is given of an example of a hardware configuration of the multifunction peripheral 100 according to the embodiment of the present invention. FIG. 3 is a block diagram illustrating an example of the hardware configuration of the multifunction peripheral 100.

First, description is given of the multifunction peripheral 100 from the main body side thereof. A primary control portion 8 is provided inside the main body of the multifunction peripheral 100. For example, the primary control portion 8 is connected to the Operation panel 1, the image reading portion 2, the sheet feeding portion 3, the conveyance path 4, the image forming portion 5, the fixing portion 6, the delivery conveyance portion 7, and the like, and controls those components.

The primary control portion 8 includes, for example, a CPU 81 and other elements for performing computation or processing. The CPU 81 performs computation or the like in accordance with a control program, which is stored in a storage portion 82 and is to be loaded therefrom, thereby controlling respective portions of the multifunction peripheral 100. Note that, as the primary control portion 8, a plurality of kinds of control portions may be provided depending on the function. For example, such control portions may include a main control portion that performs overall control, image processing, and communication control, and an engine control portion that controls printing by, for example, performing image formation and turning ON/OFF motors or the like that cause various rotational bodies to rotate.

The storage portion 82 is communicably connected to the primary control portion 8. The storage portion 82 is configured by combining non-volatile and volatile storage devices such as a ROM, a flash ROM, a RAM, a HDD, and the like. The storage portion 82 can store various pieces of data, including a control program, control data, and setting data of the multifunction peripheral 100, and image data.

Further, the primary control portion 8 is provided with an image processing portion 83 for performing an image processing on the image data obtained by reading the document by the image reading portion 2 and the image data input to the multifunction peripheral 100 via a communication portion 84. For example, the image processing portion 83 performs various kinds of image processing such as rotation, enlargement/reduction, density conversion, image quality adjustment (such as edge emphasis), an image data modification processing (for example, resolution conversion or file format (data format) conversion) for printing and transmission to the external portion. The image processing portion 83 operates according to the functions set through the Operation panel 1. The image data processed by the image processing portion 83 is, for example, transmitted to the exposure device 53 and is used for the scanning and exposure of the photosensitive drum or transmitted to the external portion from the communication portion 84.

Further, the primary control portion 8 is connected to the communication portion 84 (communication interface) provided with various connectors, a socket, a fax modem, and the like. The communication portion 84 is connected to a plurality of external computers 200 (for example, personal computers) and to the communication partner's FAX machine 300 (in FIG. 3, only one external computer 200 and one FAX machine 300 are illustrated for the sake of convenience) via a network, a public line, or the like. For example, image data obtained by the image reading portion 2 can be stored in the storage portion 82, or the image data can be transmitted to the external computer 200 or the communication partner's FAX machine 300 (the scanner function and the fax function). Note that, the multifunction peripheral 100 can use the communication portion 84 to attach the image data to an e-mail and transmit the e-mail to the external computer 200 or the communication partner's FAX machine 300 (Internet FAX function). Further, the multifunction peripheral 100 can also perform printing based on image data that has been transmitted from the external computer 200 or the communication partner's FAX machine 300 and then input to the multifunction peripheral 100 (printer function and fax function).

Further, the primary control portion 8 recognizes an input made to the Operation panel 1. Then, the primary control portion 8 controls the multifunction peripheral 100 to perform copying or the like in accordance with the settings made by the user. The Operation panel 1 includes a display control portion 10, a storage portion 18 (constituted by, for example, a ROM and a RAM), a driver circuit 19, the liquid crystal display portion 11, and the touch panel portion 12. The display control portion 10 is constituted by a CPU, an IC, and the like, issues an instruction to the driver circuit 19, and controls displaying of the liquid crystal display portion 11. Further, the display control portion 10 receives an output from the touch panel portion 12, to thereby identify the coordinates at which the liquid crystal display portion 11 is pressed. The storage portion 18 stores data such as a table indicating a correspondence between the output from the touch panel portion 12 and the coordinates. The display control portion 10 compares the coordinates of a pressed position and image data of a corresponding setting screen to each other, to thereby identify and recognize a key selected (pressed) on the setting screen.

In order to select each function of the multifunction peripheral 100 and set a setting value therefor in the operation of the multifunction peripheral 100, pressing a key (button) displayed on the liquid crystal display portion 11 is repeated from a topmost layer of the liquid crystal display portion 11. Then, every time a key is pressed, the display control portion 10 causes the liquid crystal display portion 11 to switch its display. Then, eventually, the setting value is set for the function. The display control portion 10 recognizes the selection of this function and setting contents thereof (setting value). The display control portion 10 then transmits the setting contents thereof to the primary control portion 8. By doing so, the primary control portion 8 causes the respective portions, such as the image forming portion 5, to perform an operation that reflects the function selected and set via the Operation panel 1. Thus, the intention of the user is reflected in printing and the like (for example, density setting, enlargement/reduction, etc.).

Further, image data of screens and images to be displayed by the liquid crystal display portion 11 is stored in, for example, the storage portion 18 of the Operation panel 1. Accordingly, every time a key or a button is pressed in a selection screen for the setting item or each setting screen, the display control portion 10 reads image data of a screen to be displayed next from the storage portion 18.

Further, the storage portion 18 includes, for example, one or a plurality of ROMs and RAMs. The storage portion 18 can store a program (details of which are described later). Accordingly, the storage portion 18 stores setting contents (such as setting conditions, selected functions, setting values for the function, and a registrant) of the program. Further, in the multifunction peripheral 100 (Operation panel 1) according to this embodiment, the program can be registered with a name assigned thereto. Accordingly, the storage portion 18 can store a program name in association with the program. Further, the storage portion 18 can store protection subject data D (details of which are described later) used for security protected display (details of which are described later).

(Registration of Program)

Next, referring to FIGS. 4 to 8, description is given of an outline of registration of a program performed in the multifunction peripheral 100 according to this embodiment.

First, the multifunction peripheral 100 according to this embodiment has a multitude of settable functions. Note that, there are so many kinds of functions to be provided to the multifunction peripheral 100 and so many kinds of setting screens therefor, and thus, for the sake of convenience, illustration and description thereof are omitted except examples described later.

Here, there exist functions that are often combined when the multifunction peripheral 100 is used, for example, a combination of a method of transmitting the image data obtained by the image reading portion 2 to a client (such as FAX or Internet FAX) and a transmission destinationas, a combination of aggregation printing and duplex printing set to be combined in order to suppress consumption of sheets and toner. However, the multifunction peripheral 100 has a wide variety of functions, and it is troublesome and inconvenient to make the same settings each time the multifunction peripheral 100 is used.

Therefore, on the multifunction peripheral 100 according to this embodiment, it is possible to select one or a plurality of functions once and store (register) a state in which setting values therefor are set as a program in, for example, the storage portion 18. Note that, although there is a slight difference, a setting operation for program registration basically has no great difference from a setting operation for normal copy or transmission. Only by an operation of invoking a stored program, the Operation panel 1 can be brought to a state in which a plurality of functions are set based on the contents of the program.

Next described is a specific example of registering a program through the Operation panel 1. Here, FIGS. 4 to 8 are referenced to describe an example of performing program registration regarding transmission of the image data obtained by the image reading portion 2 (FAX function, Internet FAX function, and scan function). Note that, the program can be registered with regard to not only data transmission but also copying.

<<Selection of Functions>>

Figure 4:
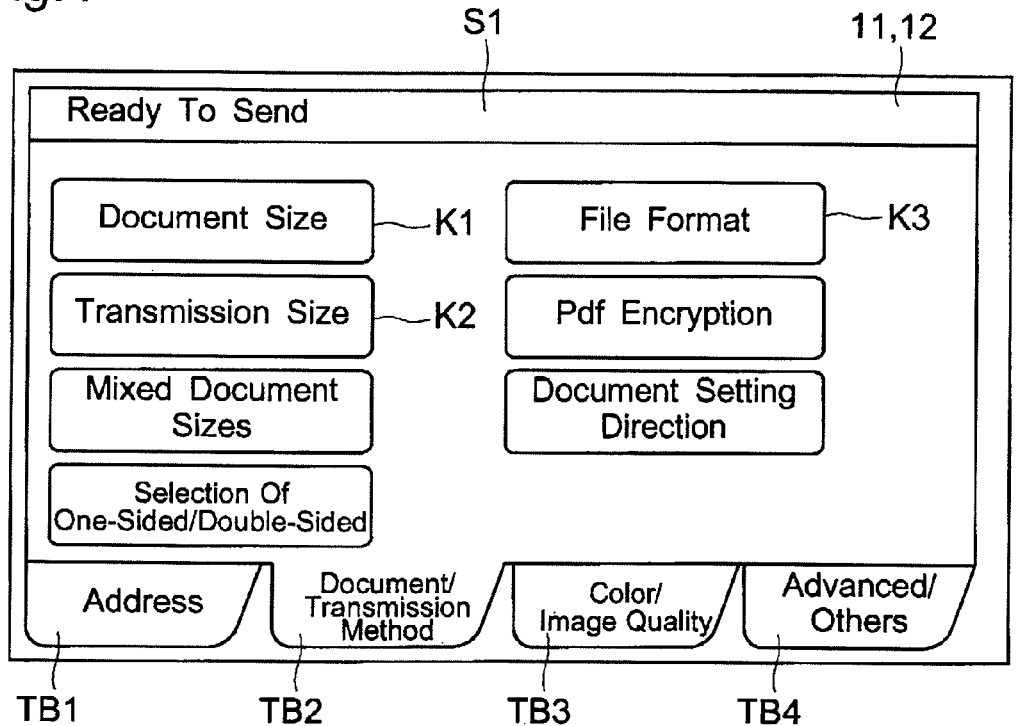
FIG. 4 is an explanatory diagram illustrating an example of a function selection screen.

First, FIG. 4 is referenced to describe selection of the functions related to the transmission. FIG. 4 is an explanatory diagram illustrating an example of a function selection screen S1.

The liquid crystal display portion 11 displays the function selection screen S1 in order to allow selection of a function to be set. On the function selection screen S1, for example, function names are arranged as keys for display. Then, the user selects (presses) a function to be used in transmission or printing. In addition, the liquid crystal display portion 11 displays the respective setting screens for the selected function. The user selects and sets various functions by pressing keys displayed on the respective setting screens or hard keys arranged around the liquid crystal display portion 11.

When the send key 16 is pressed (when a transmission function is selected), as illustrated in FIG. 4, the display control portion 10 causes the liquid crystal display portion 11 to display the function selection screen S1 for a function related to the transmission of the image data obtained by reading the document, for example, FAX or scanning. For example, as illustrated in FIG. 4, the liquid crystal display portion 11 displays, within the function selection screen S1 for the transmission, a plurality of tabs such as a destination tab TB1, a document/transmission format tab TB2, a color/image quality tab TB3, and an advanced/others tab TB4. Note that, a plurality of kinds of tabs may be further provided.

The respective functions are arranged as keys. As illustrated in FIG. 4, when the document/transmission format tab TB2 is pressed, functions (keys) related to a document to be read and a transmission format of the image data are displayed. For example, the liquid crystal display portion 11 displays a document size key K1 for setting a size of the document to be read, a transmission size key K2 for setting a size of the image data to be transmitted, a file format key K3 for setting a format (for example, PDF, TIFF, and FAX formats) and the like of the image data to be transmitted, and other such keys (functions are assigned to the other keys, but description thereof is omitted).

Further, when the destination tab TB1 is pressed, the liquid crystal display portion 11 displays a screen related to a destination setting. Further, when the color/image quality tab TB3 is pressed, the liquid crystal display portion 11 displays functions related to image quality in transmission (for example, a density setting of the document and a resolution setting of the image data to be transmitted) as keys. Further, when the advanced/others tab TB4 is pressed, the liquid crystal display portion 11 displays advanced functions related to the transmission (for example, e-mail transmission/creation) as keys.

When a function is selected on the function selection screen S1, the display control portion 10 causes the liquid crystal display portion 11 to display each of various setting screens used for setting a setting value for the selected function.

<<Setting of Setting Value>>

Figure 5:
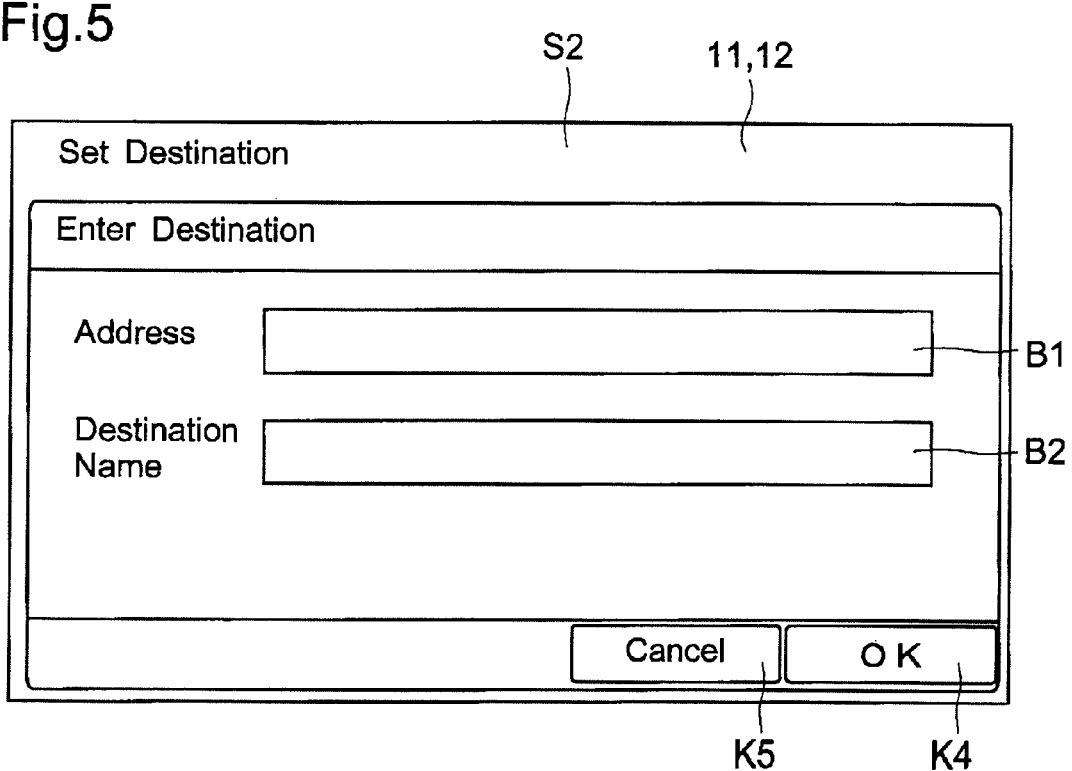
FIG. 5 is an explanatory diagram illustrating an example of a destination setting screen.
Figure 6:
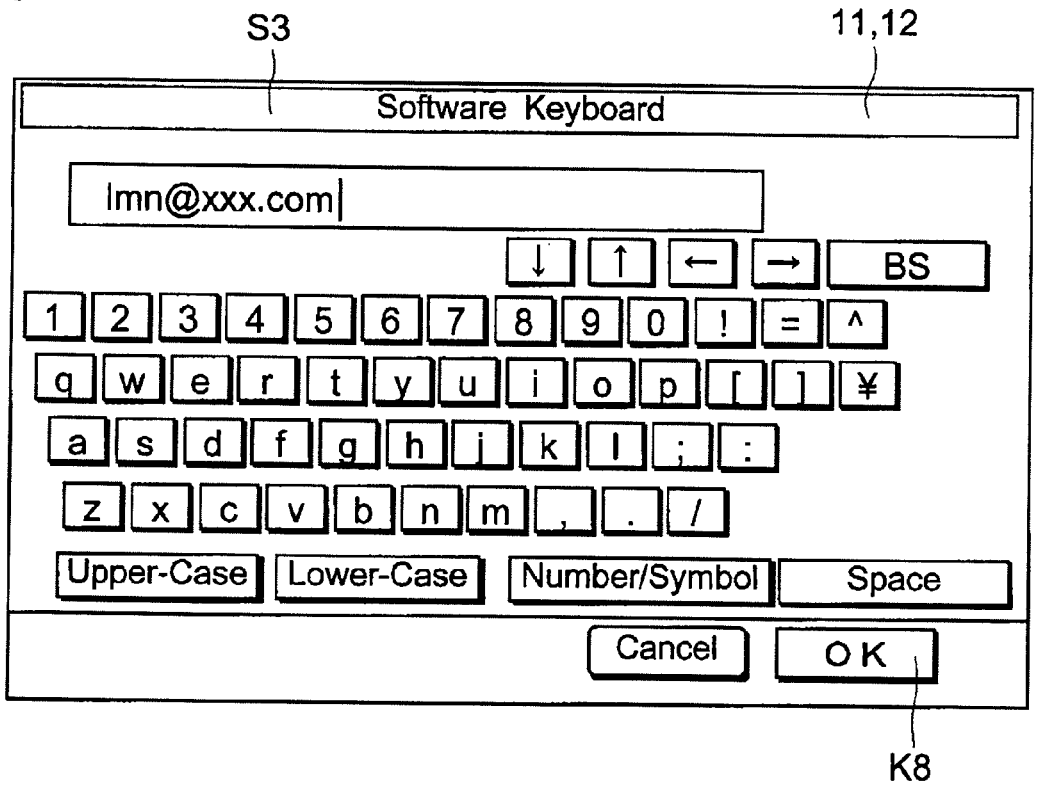
FIG. 6 is an explanatory diagram illustrating an example of a software keyboard screen that allows a character input on the operation panel.
Figure 7:
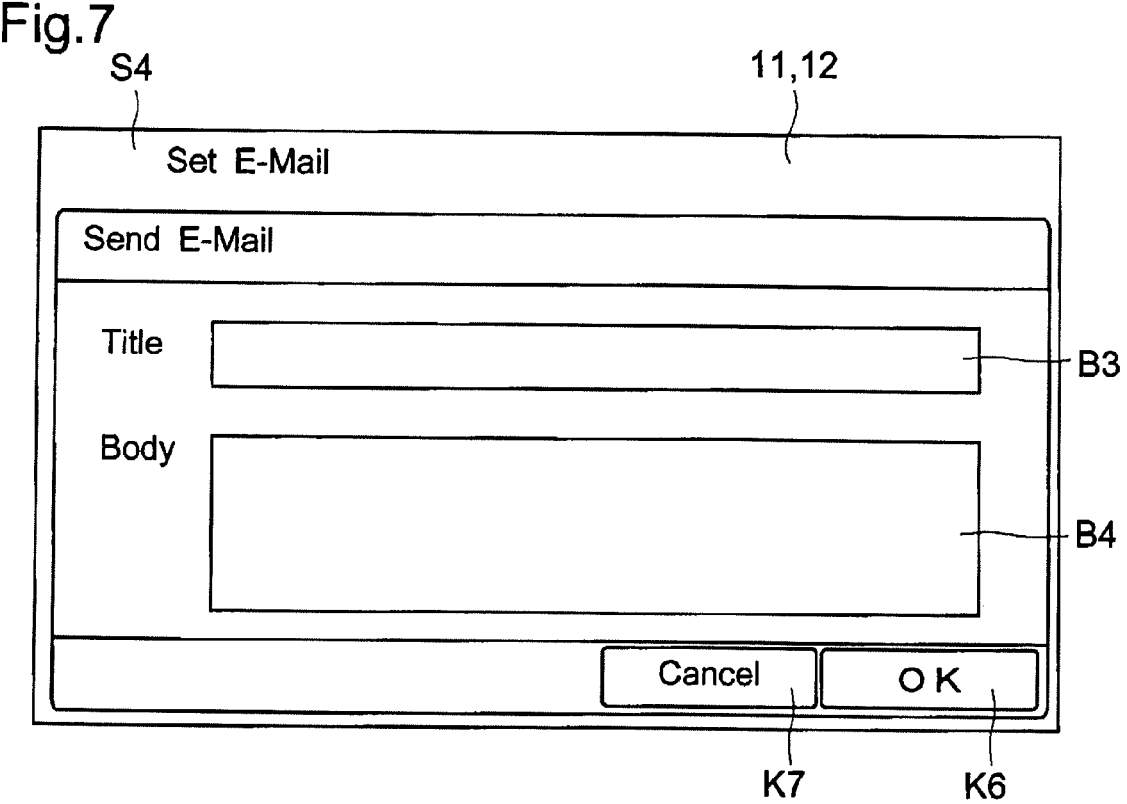
FIG. 7 is an explanatory diagram illustrating an example of an e-mail setting screen.

Therefore, FIGS. 5 to 7 are referenced to describe examples of the setting screens of functions related to transmission. FIG. 5 is an explanatory diagram illustrating an example of a destination setting screen S2. FIG. 6 is an explanatory diagram illustrating an example of a software keyboard screen S3 that allows a character input on the Operation panel 1. FIG. 7 is an explanatory diagram illustrating an example of an e-mail setting screen S4.

The destination setting screen S2 illustrated in FIG. 5 is displayed by, for example, pressing the destination tab TB1. The destination setting screen S2 is a screen for inputting destination information such as address information and a destination name. Provided on the destination setting screen S2 are, for example, an address input field B1 and a destination name input field B2. The user inputs the address information on the transmission destination of the image data in the address input field B1. For example, to transmit the image data by FAX, the user inputs the communication partner's FAX number, and to transmit the image data by Internet FAX, the user inputs the communication partner's e-mail address. For example, to transmit the image data to the computer 200, the user inputs a path to the computer 200 or a network address thereof.

The address information can be input by using the numeric keypad portion 13. Further, the input of the address information may involve input of characters and symbols. Therefore, when the address input field B1 is pressed, the display control portion 10 causes the liquid crystal display portion 11 to display, for example, the software keyboard screen S3 illustrated in FIG. 6. It is possible to input alphabet, symbols, and numerals by using a software keyboard. This allows the user to input the address information including characters and symbols such as an e-mail address. In this manner, a FAX number, an e-mail address, and the like are set as the setting values of the address information for a destination setting function.

Further, the user inputs the name of the transmission destination in the destination name input field B2. The input of the destination name may also involve the input of characters and symbols. Therefore, also when the destination name input field B2 is pressed, the display control portion 10 causes the liquid crystal display portion 11 to display the software keyboard screen S3 illustrated in FIG. 6. This allows the user to input the destination name.

Further, the destination setting screen S2 is provided with an OK key K4 and a cancel key K5. When the OK key K4 is pressed, the display control portion 10 recognizes that the transmission is to be performed with the input address information and the like. Then, the display control portion 10 informs the primary control portion 8 of the destination information such as the address information. In this manner, the primary control portion 8 causes the communication portion 84 to transmit the image data to the set address. The cancel key K5 is pressed to cancel the setting.

Further, functions to allow the user to arbitrarily input characters and the like include e-mail transmission/creation functions. For example, an e-mail creation key (not shown) displayed within the function selection screen S1 corresponding to the advanced/others tab TB4 is pressed, the display control portion 10 causes the liquid crystal display portion 11 to display the e-mail setting screen S4 illustrated in FIG. 7 (Internet FAX function when the image data is attached to the e-mail).

The e-mail setting screen S4 is provided with, for example, a title input field B3 and a body input field B4. The user inputs the title of the e-mail in the title input field B3. Further, the user inputs a body part (including greetings and description of transmission contents) of the e-mail in the body input field B4. Note that, not only the title and the body but also a header and a footer can be input.

It is necessary to input characters and symbols when inputting the body and the like of the e-mail. Therefore, when the title input field B3 or the body input field B4 is pressed, the display control portion 10 causes the liquid crystal display portion 11 to display, for example, the software keyboard screen S3 illustrated in FIG. 6. This allows the user to input characters, sentences, words, and phrases. In this manner, the characters, sentences, words, phrases, and the like are set as the setting values of the body and the like for an e-mail transmission function.

Further, the e-mail setting screen S4 is provided with an OK key K6 and a cancel key K7. When the OK key K6 is pressed, the display control portion 10 recognizes that the transmission is to be performed with the input title, body contents, and the like. Then, the display control portion 10 informs the primary control portion 8 of the input contents. Based on the received input contents, the primary control portion 8 causes the communication portion 84 to transmit the e-mail. The cancel key K7 is pressed to cancel the setting.

To end the selection of the function and the setting of the setting value and to register the setting contents as a program, for example, the user presses the program key 17 in a state in which the setting values for each of various functions are set. Note that, a registration instruction for the program and a mode of operation that leads to the program registration are not limited thereto. Then, for example, after the user performs selection/input and the like of a registration number of the program, the display control portion 10 causes the liquid crystal display portion 11 to display the software keyboard illustrated in FIG. 6 in order to assign a name to the program.

When an OK key K8 is pressed on the software keyboard screen S3 to complete the name assignment, the display control portion 10 understands that the contents obtained when the OK key K8 was pressed is the name to be assigned to the program.

Figure 8:
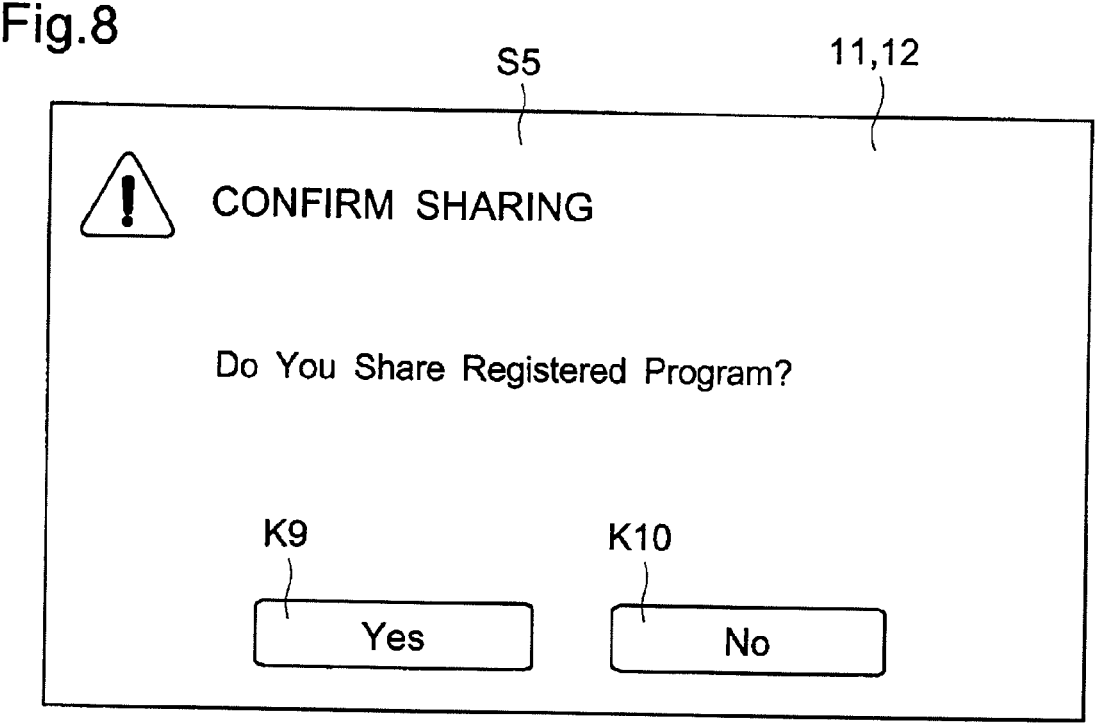
FIG. 8 is an explanatory diagram illustrating an example of a sharing confirmation screen.

Next description is given with reference to FIG. 8. FIG. 8 is an explanatory diagram illustrating an example of a sharing confirmation screen S5. When the OK key K8 is pressed on the software keyboard screen S3 to complete the name assignment, the display control portion 10 further causes the liquid crystal display portion 11 to display the sharing confirmation screen S5 illustrated in FIG. 8. The sharing confirmation screen S5 is a screen for selecting and deciding whether or not to share the program to be registered. Arranged on the sharing confirmation screen S5 are a Yes key K9 and a No key K10. To share the program, the user presses the Yes key K9. The user who does not wish to share the program presses the No key K10. The storage portion 18 stores whether or not the program is shared. When the program is shared, users other than the registrant of the program can also invoke and use the program.

When the selection is performed on the sharing confirmation screen S5, the storage portion 18 stores data (setting conditions for the program) indicating the setting contents (selected functions and setting values for the selected functions) of the program. Further, the storage portion 18 stores the program name and the setting as to whether or not to share the program in association with the program. Note that, the storage portion 18 can store several tens or more of (for example, fifty) programs. Further, the storage portion 18 also stores the registrant of the program in association with the program when the registrant is authenticated (identified). Therefore, authentication performed with the Operation panel 1 and the multifunction peripheral 100 according to this embodiment is described next.

(Authentication Performed with the Operation Panel 1 and the Multifunction Peripheral 100)

Figure 9:
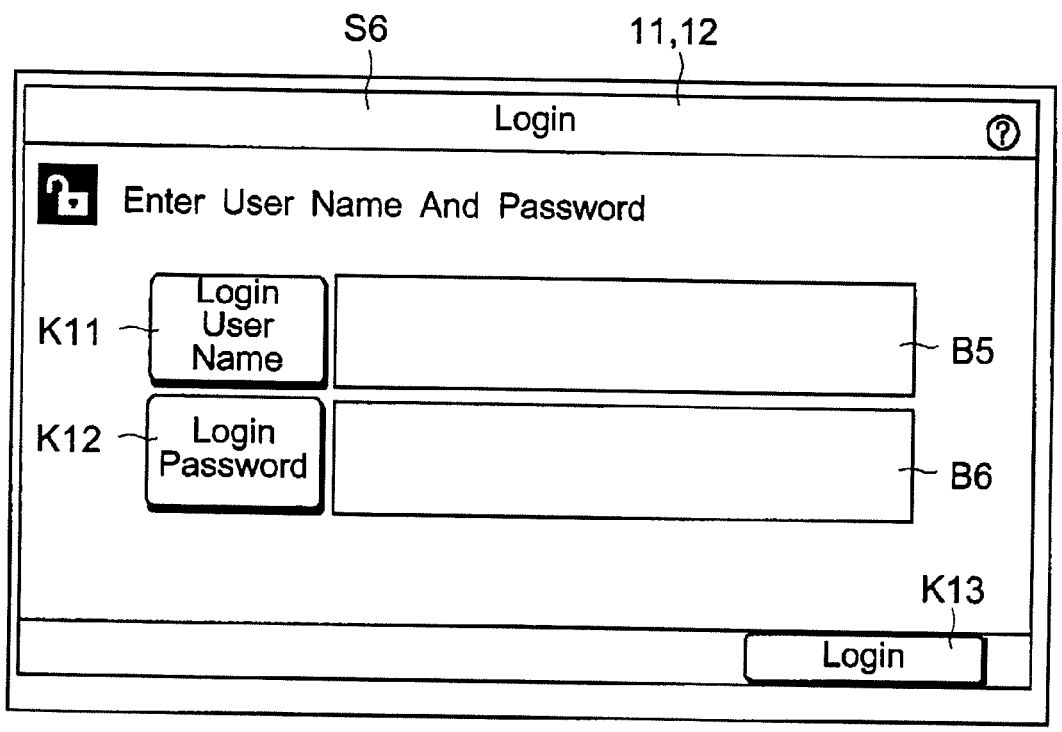
FIG. 9 is an explanatory diagram illustrating an example of a login screen.

Next, FIG. 9 is referenced to describe an example of the authentication performed with the multifunction peripheral 100 and the Operation panel 1 according to this embodiment. FIG. 9 is an explanatory diagram illustrating an example of a login screen S6 displayed on the Operation panel 1.

When a person other than the registrant of the program invokes the shared program, the Operation panel 1 performs such display as to protect the security of a part that should not be displayed as it is in view of information security (details of which are described later).

Therefore, the Operation panel 1 and the multifunction peripheral 100 according to this embodiment authenticate the user and identify the user using the Operation panel 1 (identify who is using the Operation panel 1). With the Operation panel 1 and the multifunction peripheral 100 according to this embodiment, the user undergoes authentication by performing an input to the Operation panel 1.

As illustrated in FIG. 9, to undergo authentication, the user inputs information (identification information) for identifying the user such as a user name (or user ID) and a password for login to the login screen S6. On the Operation panel 1 according to this embodiment, the input of the identification information to the login screen S6 illustrated in FIG. 9 is required before the setting of the various functions. The various functions can be set only after the authentication is performed. In other words, when the multifunction peripheral 100 is in a logged-out state, the liquid crystal display portion 11 displays the login screen S6, and the login is necessary to make various settings. The Operation panel 1 shifts from the logged-in state to the logged-out state in, for example, a case where a specific key is pressed on the Operation panel 1 or a case where an operation has not been performed on the Operation panel 1 for a predetermined period of time (for example, several seconds to several minutes) after the end of a job.

For example, when the user presses a login user name key K11, the display control portion 10 causes the liquid crystal display portion 11 to display the software keyboard screen S3 illustrated in FIG. 6. Further, the software keyboard screen S3 is displayed also when a login password key K12 is pressed. Then, the user inputs his/her own login user name and login password separately. Then, the display control portion 10 causes the liquid crystal display portion 11 to display input results in a login user name display field B5 and a login password display field B6.

After finishing inputting the identification information, the user presses a login key K13. When the login key K13 is pressed, an authentication processing is performed. For example, in this embodiment, authentication information (data on the login user name and the login password of each user corresponding to the identification information) is stored in the storage portion 18. Then, the display control portion 10 (corresponding to an authentication portion) compares the input identification information to the authentication information stored in the storage portion 18 and confirms whether or not there is a match. When there is a match, the display control portion 10 recognizes the user and cancels a locked state (state of rejecting an input). This brings the Operation panel 1 to a state of being ready to receive settings of various functions such as copy and an instruction to start a job (logged-out state→logged-in state).

Note that, the authentication processing may be performed by the primary control portion 8 in place of the display control portion 10. In this case, for example, the authentication information is stored in the storage portion 82 on a main body side. Then, the input identification information is transmitted from the display control portion 10 to the primary control portion 8. The primary control portion 8 compares the identification information to the authentication information stored in the storage portion 82 and confirms whether or not there is a match. When there is a match, the primary control portion 8 transmits to the Operation panel 1 (display control portion 10) the fact that an input can be received (that the Operation panel 1 should shift to the logged-in state) and the data indicating the identified user.

In addition, the authentication of the user may be performed based on a recording medium such as an IC card. For example, in a case of using a card, information (identification information such as the user name and the password for login) for identifying the user is stored in the card in advance. The multifunction peripheral 100 and the Operation panel 1 are provided with a card reader (not shown). The card reader reads the card. Then, the display control portion 10 or the primary control portion 8 compares the identification information obtained by the reading to the authentication information and identifies the user.

In this manner, the multifunction peripheral 100 and the Operation panel 1 according to this embodiment can perform the authentication processing by using portions such as the display control portion 10 and the storage portion 18 of the Operation panel 1 or portions such as the primary control portion 8 and the storage portion 82. Note that, the Operation panel 1 and the multifunction peripheral 100 can have an authentication function as long as one of the input to the Operation panel 1 and the card reading is possible.

(Invocation and Use of the Program)

Figure 10:
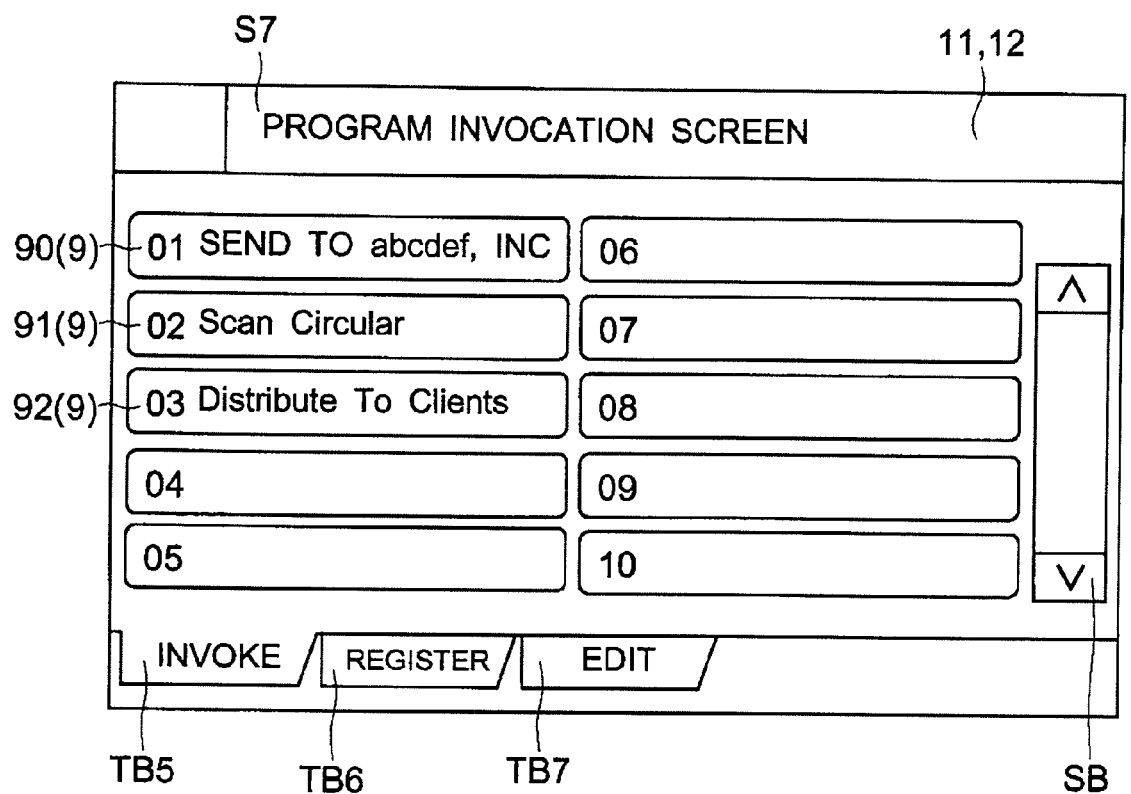
FIG. 10 is an explanatory diagram illustrating an example for an invocation screen of a program.

Next, FIG. 10 is referenced to describe an example of invocation of a program according to this embodiment. FIG. 10 is an explanatory diagram illustrating an example of an invocation screen S7 of the program according to this embodiment.

For example, to invoke the registered program, the user presses the program key 17 (see FIG. 2). With this operation, as illustrated in FIG. 10, the invocation screen S7 for selecting the registered program is displayed on the liquid crystal display portion 11. The respective programs are displayed as program buttons 9 in parallel in a list. Program names are displayed within the respective program buttons 9 associated with the registered programs. Note that, the program buttons 9 corresponding to numbers to which no program has been assigned yet are blank.

For example, FIG. 10 illustrates an example in which three programs named "Send to abcdef, Inc.", "Scan circular", and "Distribute to clients" are registered and displayed as buttons (program buttons 90 to 92) on the invocation screen S7. When the program button 9 is pressed, the corresponding program is invoked from the storage portion 18. Then, the display control portion 10 brings the Operation panel 1 to a state in which the setting contents of the program are set.

Note that, a plurality of tabs are provided to a lower part of the invocation screen S7. An invocation tab TB5 is pressed to invoke the registered program. A registration tab TB6 is pressed in the program registration in a case of specifying a registration number of the program (selecting the program buttons 9 to be associated thereto) and other such cases. An edit tab TB7 is pressed in a case of modification of the program contents such as deletion of the registered program, addition or change of the setting value, or reconfiguration as to whether or not to share the program.

In addition, for example, tens or more of programs can be registered, and hence a single screen may not be able to display therein all the programs. Accordingly, a scrollbar SB is provided on a right side of the invocation screen S7. When the scrollbar SB is operated, the display control portion 10 causes the liquid crystal display portion 11 to display different program buttons 9.

(Security Protected Display: Setting Value)

Figure 11:
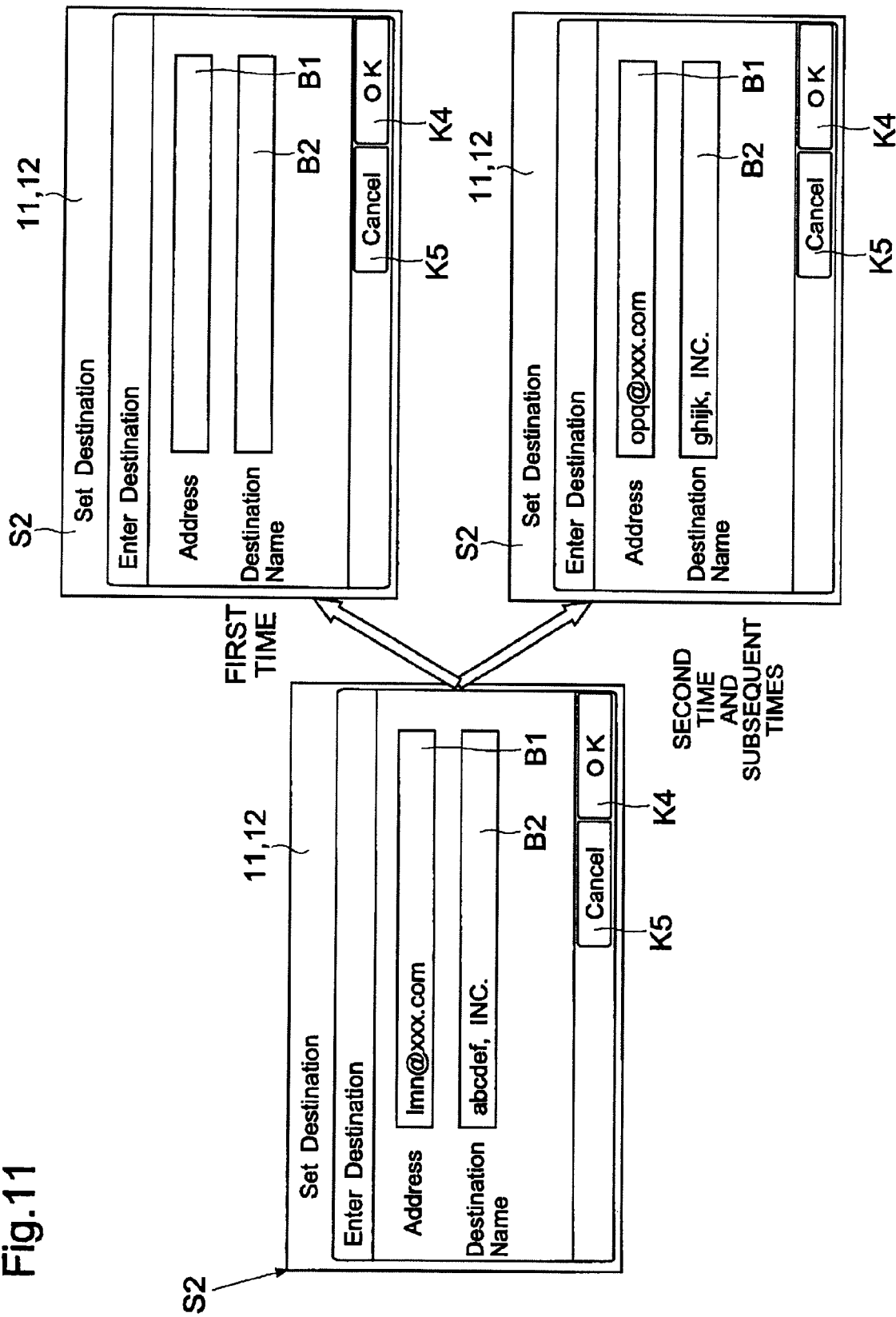
FIG. 11 is an explanatory diagram illustrating an example of protected display for a shared program.
Figure 12:
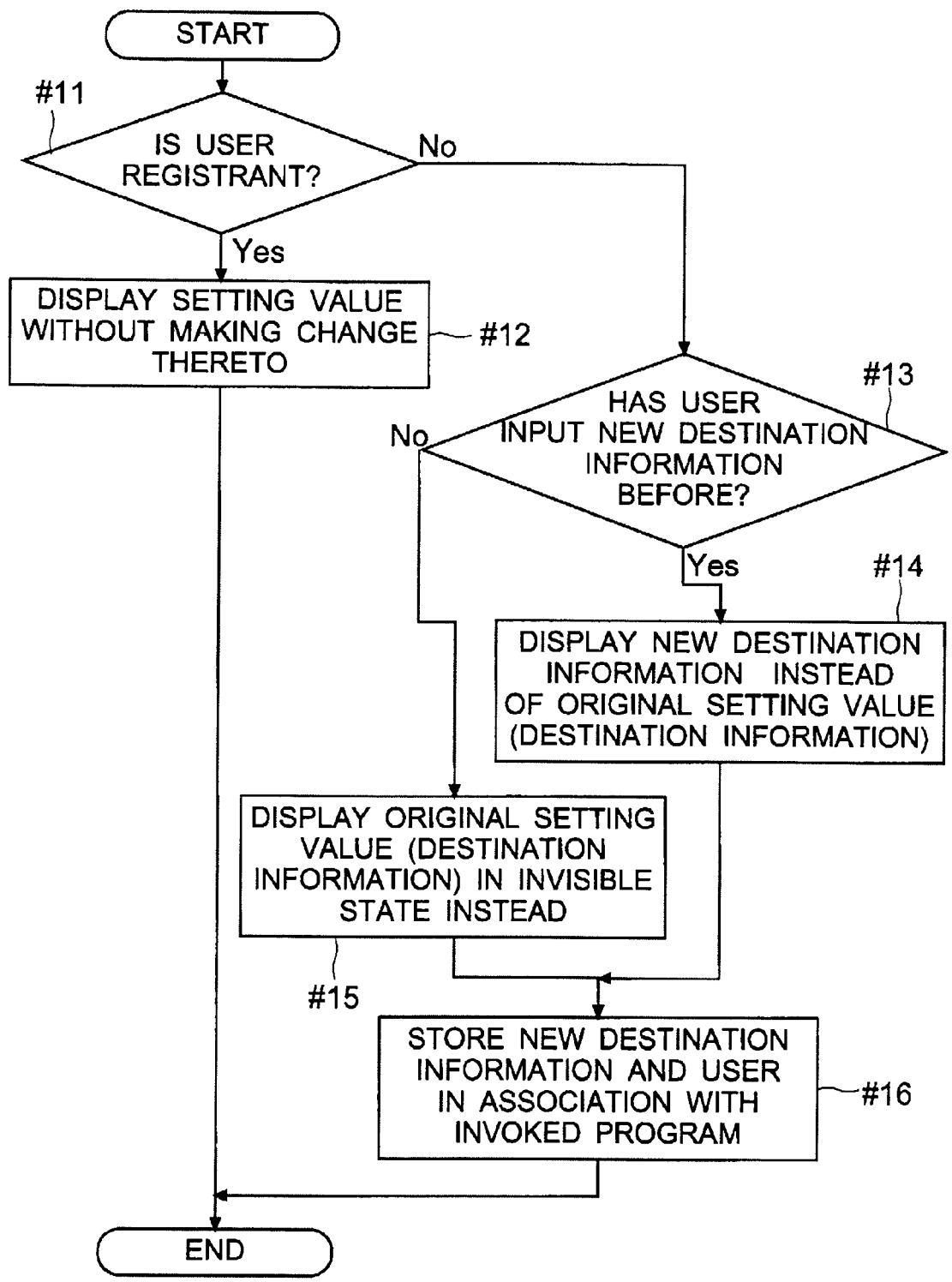
FIG. 12 is a flowchart illustrating an example of security protected display for the shared program.
Figure 13:
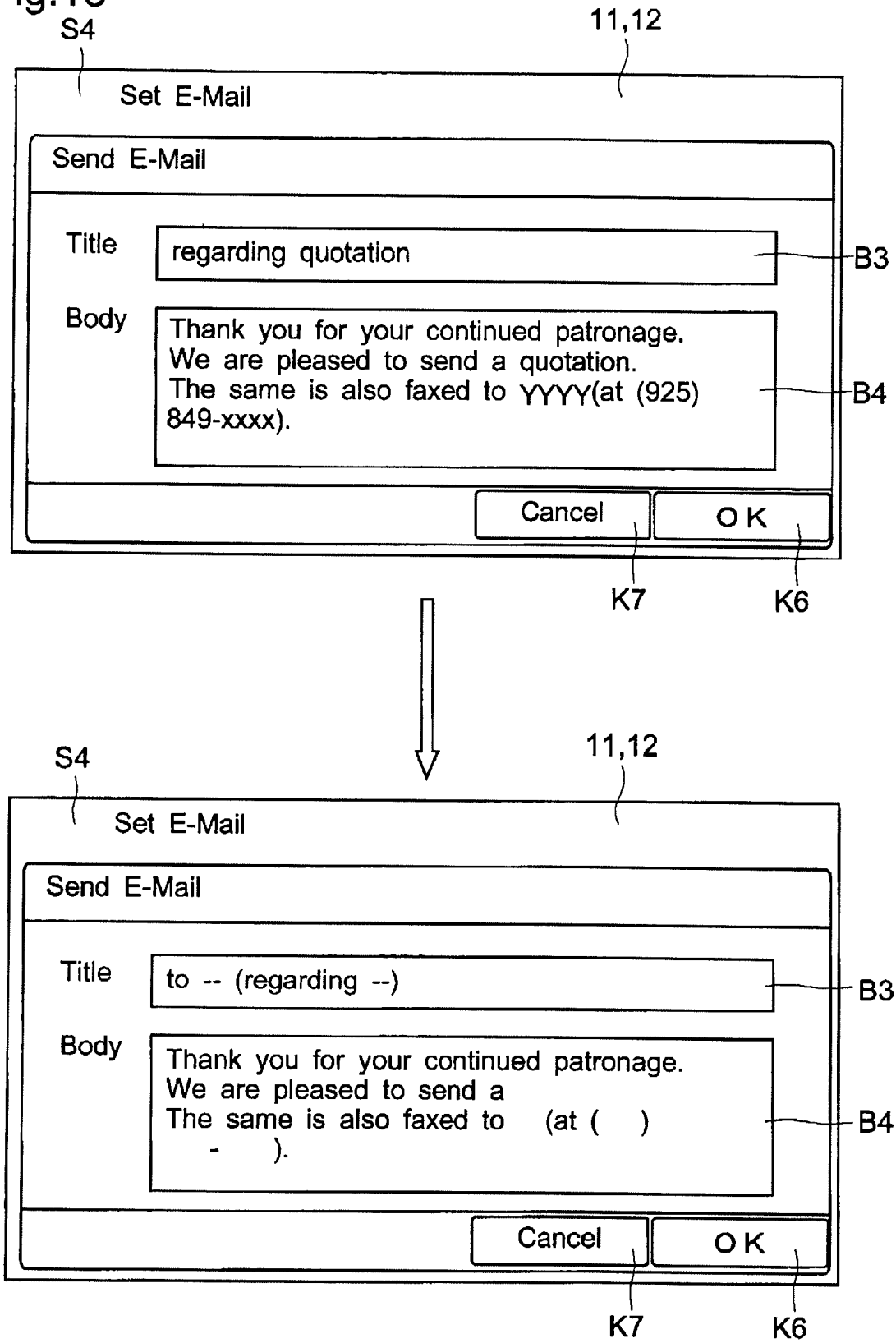
FIG. 13 is an explanatory diagram illustrating an example of the protected display for the shared program.

Next, FIGS. 11 to 13 are referenced to describe protected display of the setting value for the shared program according to this embodiment. Note that, in this example, the protected display of the setting value for the program is exemplified by program protected display of the destination information and the contents of an e-mail.

<<Security Protected Display of the Destination Information>>

First, FIGS. 11 and 12 are referenced to describe an example of the security protected display of the destination information set as the setting values for the program. FIG. 11 is an explanatory diagram illustrating an example of the protected display for the shared program. FIG. 12 is a flowchart illustrating an example of the security protected display for the shared program.

The specific address information and destination name can be included in the program in which the address information and destination name are registered as the setting values. While information such as the address information should be protected as personal information or classified information, sharing such a program as described above adversely allows any person that has invoked the program to know the specific address information and destination information.

In order to prevent such leakage of information to be protected in view of information security, the program including the address information and the like has been avoided from being registered, or in a case where the authentication function exists, only the registrant has been allowed to invoke the program including the address information and the like (the program is dedicated to the registrant). However, this does not allow, in particular, the program for transmission to be shared, and the respective users must create their own programs or perform setting each time transmission is performed. Accordingly, a program function may hardly be used. Therefore, on the Operation panel 1 and the multifunction peripheral 100 according to this embodiment, the security protected display is performed on the destination information (address information and destination name) among the setting values set for the program.

FIG. 11 illustrates an example of the security protected display for the program in which the destination information (address information and destination name) is set as the setting values. For example, when the program in which the destination information is set as the setting values is invoked by the person other than the registrant, the display control portion 10 causes the liquid crystal display portion 11 to perform such display as to bring the destination information to an invisible state. For example, the display control portion 10 effects the invisible state by changing the destination information to a blank or deleting the destination information.

For example, of the respective screens illustrated in FIG. 11, the destination setting screen S2 on the left side is a screen displayed when the registrant invokes the program. The registrant of the program does not cause the leakage of information. Accordingly, when the registrant of the program invokes the program himself/herself, the destination information is displayed as set in the program registration. For example, FIG. 11 illustrates an example in which the program has the setting value of the address information set to "lmn@xxx.com" and the setting value of the destination name set to "abcdef, Inc.".

On the other hand, of the respective screens illustrated in FIG. 11, the destination setting screen S2 on the right top side is an example of a screen displayed when the person other than the registrant invokes the program. When the person other than the registrant invokes the program, the information to be protected is turned to a blank and displayed in the invisible state (the information to be protected may be deleted instead of being turned to a blank). In other words, even when the program in which the destination information and the like are set as the setting values is invoked, when it is the person other than the registrant who invokes the program, the destination information and the like as the setting values are not displayed. the security protected display is thus performed, and hence the person other than the registrant who invokes the program needs to input the address information and the destination name.

Note that, of the respective screens illustrated in FIG. 11, the destination setting screen S2 on the right bottom side is an example of the screen displayed when the person other than the registrant invokes the program. As illustrated on the right top side of FIG. 11, when the person other than the registrant invokes the program, the destination information is not displayed in the first place. However, when the user newly inputs the destination information to execute a transmission job, the storage portion 18 stores the newly input destination information (new destination information) and the user who has invoked the program in association with the program.

Next time the same program is invoked by the same user and at the subsequent times, the display control portion 10 accesses the storage portion 18 to confirm the association with the program, and causes the liquid crystal display portion 11 to display the new destination information according to the user. In this manner, once the shared program is invoked and the destination information is set, the inputting becomes unnecessary afterward.

As described above, the leakage of the information to be protected can be prevented even when the program is shared. Further, the registrant of the program can feel free to share the program. With this configuration, the sharing of the program is promoted, and a large number of programs are registered and accumulated. As a result, it becomes much easier to perform setting on the Operation panel 1, which enhances usability thereof.

Next, FIG. 12 is referenced to describe an example of display control performed when the program including the destination information as the setting value is invoked according to this embodiment.

First, the start of FIG. 12 is a time point at which the program including the destination information as the setting value is invoked when any one of the program buttons 9 is pressed after the program key 17 is pressed and the invocation screen S7 is displayed.

Then, the display control portion 10 first confirms whether or not the person who has invoked the program is the registrant of the program (Step #11). When the person is the registrant of the program (Yes in Step #11), there is no need to perform the security protected display. Therefore, the display control portion 10 sets the Operation panel 1 to a state of being set by the setting contents of the program, and causes the liquid crystal display portion 11 to display the setting value without making a change thereto (Step #12). Then, various settings are made on the Operation panel 1, and the transmission job is executed, which ends the display control for security protection (end).

On the other hand, when the person who has invoked the program is not the registrant of the program (No in Step #11), the display control portion 10 confirms the storage portion 18 as to whether or not the user who has invoked the program has input the new destination information before (Step #13).

When the new destination information has been input before (Yes in Step #13), the display control portion 10 causes the liquid crystal display portion 11 to display the new destination information instead of the original setting value (destination information) (Step #14). With this operation, the display control portion 10 brings the Operation panel 1 to a state in which settings have been made by the setting contents of the program with the setting value changed from the destination information to the new destination information. This allows such display as to prevent the leakage of the information to be protected while making use of the other settings (for example, a size of the document to be transmitted) within the program.

On the other hand, when the user has not been input the new destination information before (No in Step #13), the display control portion 10 causes the liquid crystal display portion 11 to display the original setting value (destination information) in the invisible state (blank or deleted state) (Step #15). With this operation, the display control portion 10 erases the setting values of the destination information, and brings the other setting values to the state in which settings have been made by the setting contents of the program.

After Step #14 and Step #15, the start key 14 is pressed, and the transmission job is executed. When the transmission job or the like is executed, the storage portion 18 stores the new destination information input by the user and the logged-in user in association with the invoked program instead of the destination information brought to the invisible state (Step #16). Then, the display control for security protection is finished (end).

<<Security Protected Display of a Registrant Arbitrary Input Part>>

Next, FIGS. 13 and 14 are referenced to describe an example of the security protected display of contents of a registrant arbitrary input part set as the setting value by the program. FIG. 13 is an explanatory diagram illustrating an example of the protected display for the shared program. FIG. 14 is an explanatory diagram illustrating an example of data that defines protection subjects.

In the program registration, there is a function that allows the registrant to arbitrarily (freely) perform inputting and define the setting value (for example, sentences of the e-mail or the address information) instead of selecting a desired setting value from a plurality of prepared setting values (for example, selection of a sheet size).

Therefore, the description is given by taking the e-mail transmission function as an example of the function that allows the registrant to arbitrarily (freely) perform inputting and define the setting value. As described above, with the Operation panel 1 and the multifunction peripheral 100 according to this embodiment, the program can be registered by setting the e-mail body and title as the setting values. However, personal information and classified information may be included in the e-mail body and the like. Therefore, the display control portion 10 causes the liquid crystal display portion 11 to perform the security protected display of the information (part) to be protected within the setting value for the e-mail transmission function included in the program.

For example, the display control portion 10 causes the liquid crystal display portion 11 to display a part to be protected in view of information security within the setting value such as the body, that is, a protection subject (characters, symbols, numerals, or a combination thereof) in the invisible state. For example, the display control portion 10 changes the destination information to a blank or deletes the destination information to effect the invisible state. The data that defines protection subjects (protection subject data D, that is, data that defines parts to be subjected to the security protected display) is stored in the storage portion 18 in advance.

For example, of the respective screens illustrated in FIG. 13, the e-mail setting screen S4 on the top side is an example of the screen displayed when the registrant invokes the program. When the registrant of the program invokes the program himself/herself, information leakage may be ignored. Accordingly, when the registrant invokes the registered program himself/herself, the display control portion 10 causes the liquid crystal display portion 11 to display the contents such as the body and title of the e-mail as set in the program registration without performing the security protected display.

On the other hand, of the respective screens illustrated in FIG. 13, the e-mail setting screen S4 on the bottom side is an example of the screen displayed when the person other than the registrant invokes the program. As illustrated in FIG. 13, when the person other than the registrant invokes the program, the display control portion 10 causes the liquid crystal display portion 11 to display the part of the protection subject in the invisible state (blank display in the example illustrated in FIG. 13). In other words, when the person other than the registrant invokes the program, the part of the setting value corresponding to the protection subject is not displayed.

As illustrated in FIG. 14, the protection subject data D has, for example, a table format. Characters, numerals, symbols, or a combination thereof are defined as the protection subjects in the table. Then, the display control portion 10 compares a plurality of protection subjects defined in advance to the contents of the registrant arbitrary input part. Then, the display control portion 10 recognizes the part to be protected (protection subject) within the setting value, and performs the security protected display of the part of the protection subject.

In the display control of the security protected display of the registrant arbitrary input part, when the program is invoked, the display control portion 10 confirms whether or not the person who has invoked the program is the registrant. In a case where the person other than the registrant has invoked the program, the display control portion 10 compares the registrant arbitrary input part provided as the setting value such as the body or the like of the e-mail to the protection subject data D, and causes the liquid crystal display portion 11 to display the matched part in an invisible manner.

(Security Protected Display: Program Name)

Figure 15:
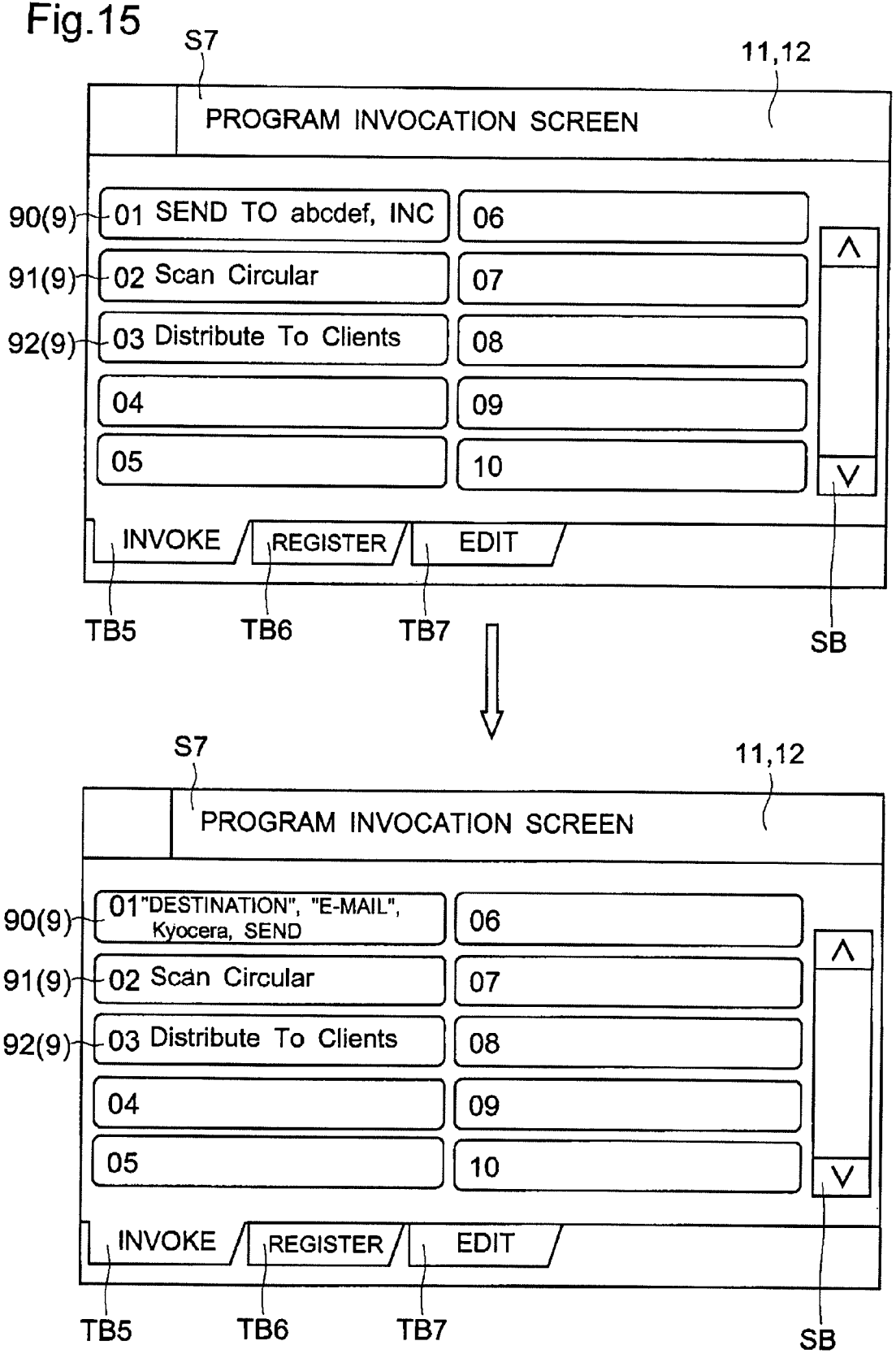
FIG. 15 is an explanatory diagram illustrating an example of the security protected display on the invocation screen of the program.
Figure 16:
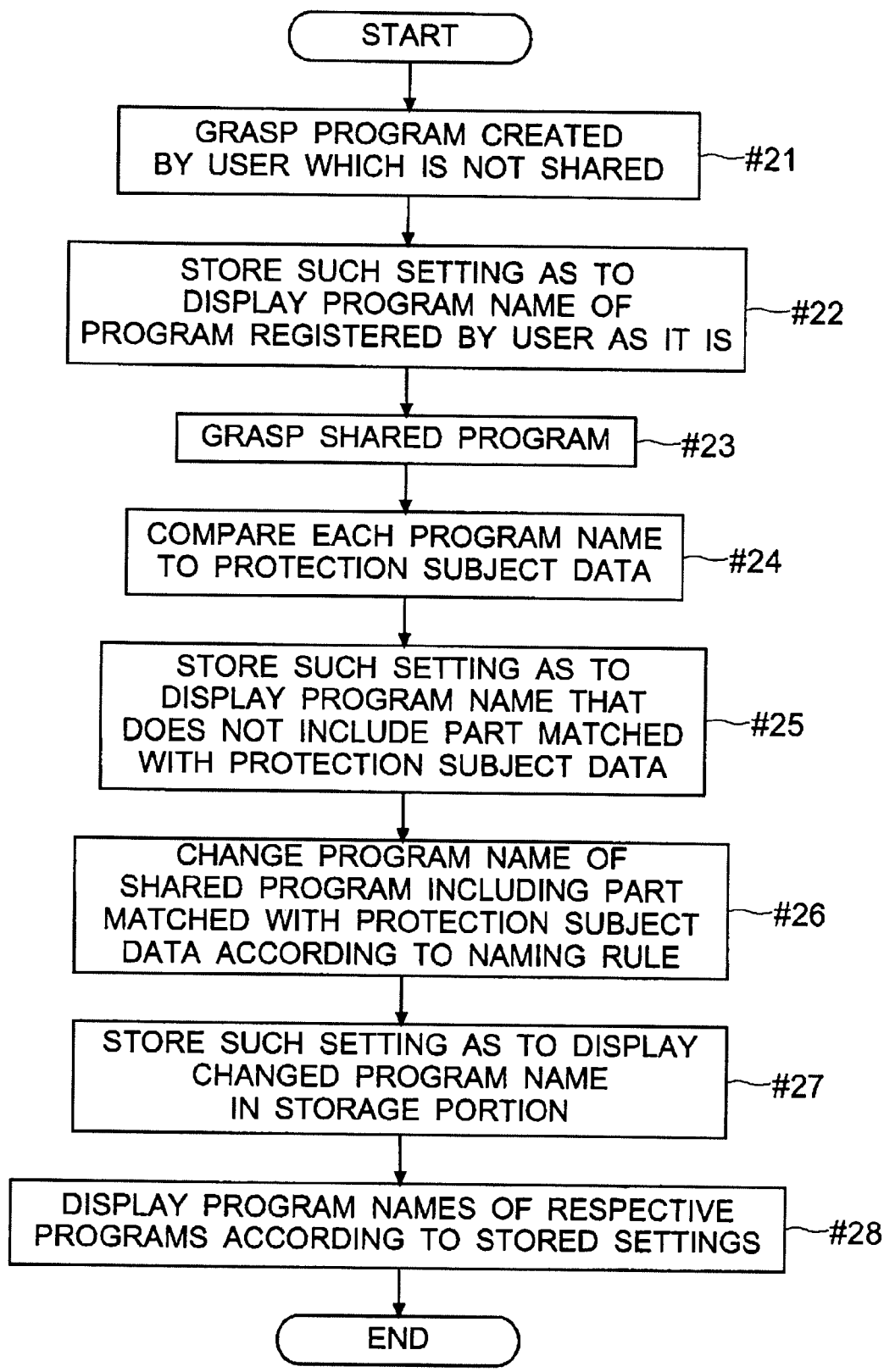
FIG. 16 is a flowchart illustrating an example of display control of a program name on the operation panel.

Next, FIGS. 15 and 16 are referenced to describe the security protected display of the program name for the shared program according to this embodiment.

First, FIG. 15 is referenced to describe an example of the security protected display related to the program name. FIG. 15 is an explanatory diagram illustrating an example of the security protected display on the invocation screen S7 of the program.

Each user is allowed to assign an arbitrary name to the program in the program registration. However, the program name may include the information to be protected such as the name of the communication partner at the transmission destination and the address information thereon. Sharing the program to which such a name is assigned adversely allows any person that has invoked the program to know the information to be protected.

Therefore, on the Operation panel 1 and the multifunction peripheral 100 according to this embodiment, the display control portion 10 causes the liquid crystal display portion 11 to perform the security protected display on the part to be protected in view of information security within the program name. For example, the display control portion 10 causes the liquid crystal display portion 11 to display the protection subject to be protected in view of information security within the program name by making a change thereto.

For example, of the invocation screens S7 for programs illustrated in FIG. 15, the invocation screen S7 on the top side is an example of the screen displayed when the registrant of the program of the program button 9 invokes the program. When the registrant of the program name including the part to be protected invokes the program himself/herself, the information leakage may be ignored. Accordingly, when the registrant invokes the registered program himself/herself, the display control portion 10 causes the liquid crystal display portion 11 to display the program name as assigned (as it is).

On the other hand, of the invocation screens S7 illustrated in FIG. 15, the invocation screen S7 on the bottom side is an example of the screen displayed when the person other than the registrant of the program of each program button 9 invokes the program. As illustrated in FIG. 15, when the person other than the registrant invokes the program, the display control portion 10 causes the liquid crystal display portion 11 to display the protection subject by making a change thereto. In other words, the display control portion 10 does not cause the liquid crystal display portion 11 to display the program name as assigned (as it is).

The display control portion 10 determines whether or not the program name includes the protection subject based on the protection subject data D. For example, as in the case of the setting values (body and title) of the e-mail, the protection subject data D is stored in the storage portion 18 in advance (see FIG. 14). Note that, the protection subject data D may be the same as the data used in the security protected display of the setting values for the e-mail (may be caused to differ and a plurality of kinds of the subject data D may be provided).

FIG. 15 is referenced to describe a specific example. The description is made on the assumption that the original program name "abcdef, Inc." indicated on the program button 90 is the protection subject (included in the protection subject data D). In this case, when the registrant views the invocation screen S7, as illustrated on the top of FIG. 15, the display control portion 10 causes the liquid crystal display portion 11 to display the program name as it is.

On the other hand, when the invocation screen S7 for the user other than the registrant of the shared program is viewed, the display control portion 10 causes the liquid crystal display portion 11 to display the "abcdef, Inc." part by making a change thereto. A naming rule used in this change can be appropriately set. Here, the display control portion 10 causes the display by changing the name based on a registrant name (exemplified by "Kyocera" in FIG. 15) and function names (exemplified by "destination" and "e-mail" in FIG. 15) included in the program (in addition, for example, renaming may be performed based on other factors such as a registration date of the program).

Next, FIG. 16 is referenced to describe an example of the display control of the program name on the Operation panel 1 according to this embodiment. FIG. 16 is a flowchart illustrating an example of the display control of the program name on the Operation panel 1.

First, the display control portion 10 confirms the contents of the storage portion 18 to grasp the program created by the user which is not shared (Step #21). The display control portion 10 causes the storage portion 18 to store such a setting as to display the program name of the program registered by the user as it is (Step #22).

Subsequently, the display control portion 10 confirms the contents of the storage portion 18 to grasp the shared program (Step #23). For example, grasped program names are temporarily accumulated in a memory within the display control portion 10 or the storage portion 18. Then, the display control portion 10 compares each of the program names grasped in Step #23 to the protection subject data D (Step #24). In addition, the display control portion 10 causes the storage portion 18 (for example, a RAM; the same applies to the following description) to store such a setting as to display the program name that does not include a part matched with the protection subject data D (does not include the protection subject) as it is (Step #25).

Further, the display control portion 10 changes a part (or the entirety) of the program name of a shared program including the part matched with the protection subject data D according to the naming rule (Step #26). Then, the display control portion 10 causes the storage portion 18 to store such a setting as to display the changed program name (Step #27). Then, the display control portion 10 causes the liquid crystal display portion 11 to display the program names of the respective programs according to the settings stored in the storage portion 18 (Step #28). When the program whose use is wished by the user is selected or when the invocation screen S7 is caused to transition to another screen, the above-mentioned display control is finished (end).

(Settings Related to the Security Protected Display)

Figure 17:
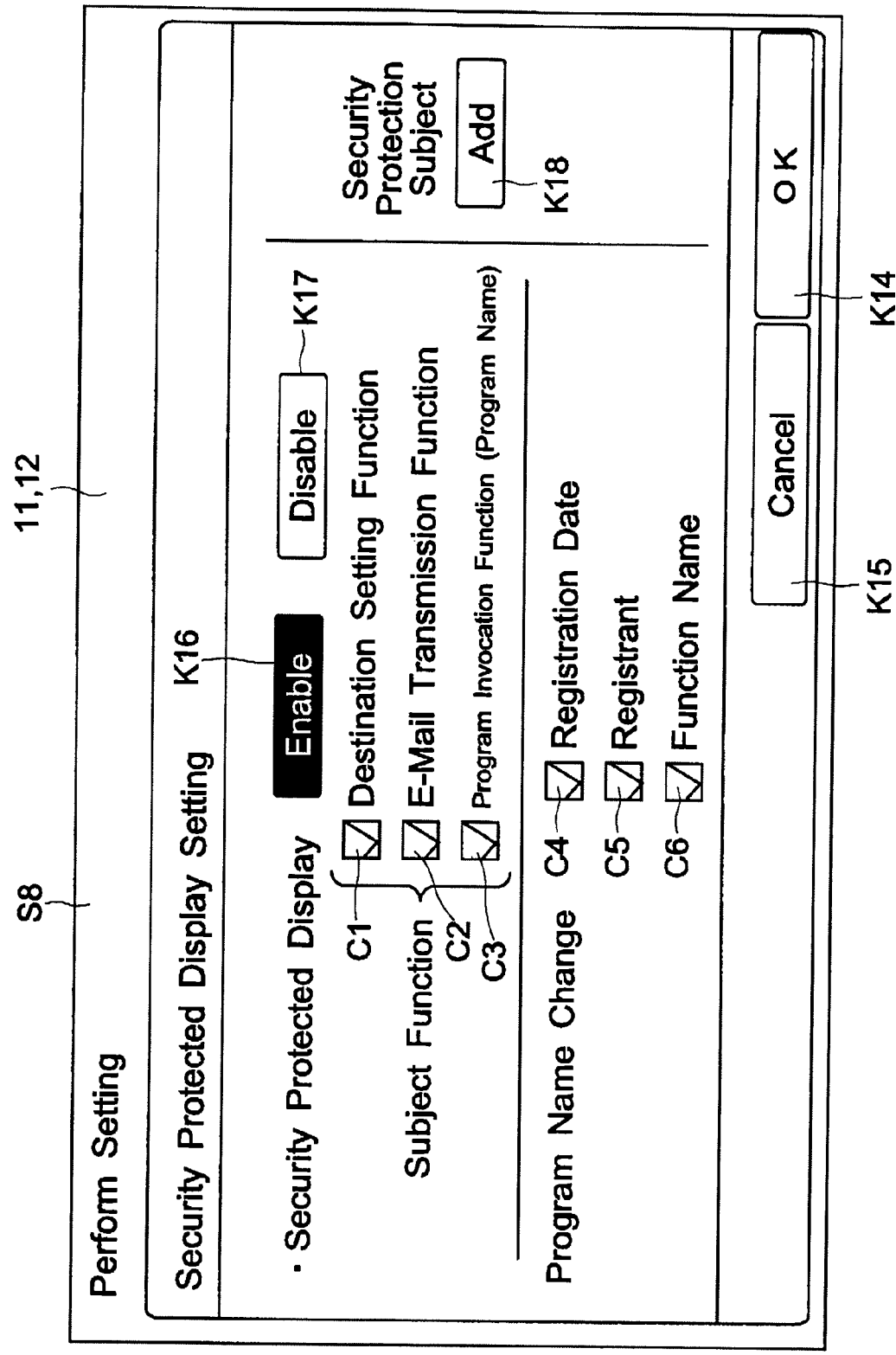
FIG. 17 is an explanatory diagram illustrating an example of a protected display setting screen.

Next, FIG. 17 is referenced to describe an example of settings related to the security protected display according to this embodiment. FIG. 17 is an explanatory diagram illustrating an example of a setting screen for the security protected display (protected display setting screen S8).

The Operation panel 1 according to this embodiment allows the settings related to the security protected display to be made. By operating the Operation panel 1, it is possible to display the protected display setting screen S8 illustrated in FIG. 17.

The protected display setting screen S8 is provided with an OK key K14 and a cancel key K15. When the OK key K14 is pressed, the display control portion 10 causes the storage portion 18 to store the contents set on the protected display setting screen S8, and performs the display based on the stored contents. The cancel key K15 is pressed to stop making the settings of the security protected display.

The protected display setting screen S8 is provided with an enable key K16 and a disable key K17. The enable key K16 is pressed to select such a setting as to enable the security protected display. After the OK key K14 is pressed with the enable key K16 selected, the display control portion 10 causes the security protected display to be performed. The disable key K17 is pressed to select such a setting as to disable the security protected display. After the OK key K14 is pressed with the disable key K17 selected, the display control portion 10 inhibits the security protected display from being performed.

Three checkboxes C1, C2, and C3 are provided below the enable key K16. The checkbox C1 is pressed (checked) to select such a setting as to enable the security protected display (invisible display) of the destination information (destination setting function). After the OK key K14 is pressed with the checkbox C1 checked, the display control portion 10 causes the liquid crystal display portion 11 to perform the security protected display of the destination information (destination setting function).

The checkbox C2 is pressed (checked) to select such a setting as to enable the security protected display (invisible display) of the e-mail (such as the body and title for the e-mail transmission function). After the OK key K14 is pressed with the checkbox C2 checked, the display control portion 10 causes the liquid crystal display portion 11 to perform the security protected display of the contents of the e-mail for the invoked program.

The checkbox C3 is pressed (checked) to select such a setting as to enable the security protected display (changing) of the program name (on the invocation screen S7 of the program). After the OK key K14 is pressed with the checkbox C3 checked, the display control portion 10 causes the liquid crystal display portion 11 to perform the security protected display that changes the name when the program name includes the protection subject.

In addition, three checkboxes (checkboxes C4, C5, and C6) are provided on the right of the item "program name change". The checkboxes C4 to C6 relate to the naming rule according to which the name is changed.

The checkbox C4 is pressed (checked) to select such a setting as to enable the security protected display that changes the program name by replacing the registration date of the program. After the OK key K14 is pressed with the checkbox C4 checked, the display control portion 10 causes the liquid crystal display portion 11 to display the changed program name including the registration date of the program.

The checkbox C5 is pressed (checked) to select such a setting as to enable the security protected display that changes the program name by replacing a part to be changed by the registrant of the program. After the OK key K14 is pressed with the checkbox C5 checked, the display control portion 10 causes the liquid crystal display portion 11 to display the changed program name including the registrant of the program.

The checkbox C6 is pressed (checked) to select such a setting as to enable the security protected display that changes the program name by replacing a part to be changed by the function name included in the program. After the OK key K14 is pressed with the checkbox C6 checked, the display control portion 10 causes the liquid crystal display portion 11 to display the changed program name including the function name selected by the program.

In addition, an addition key K18 is provided in the right end part of the protected display setting screen S8. The addition key K18 is pressed to add a new protection subject to the protection subject data D. When the addition key K18 is pressed, for example, the liquid crystal display portion 11 displays the software keyboard screen S3 (FIG. 6). Then, the user inputs the protection subject to be added. Then, the storage portion 18 stores the characters, numerals, and symbols, which have been input to be added, so as to be added to the protection subject data D. Note that, the contents of the protection subject data D which have already been stored can be deleted or changed.

As described above, the display input device (Operation panel 1) according to this embodiment includes the display portion (liquid crystal display portion 11) for displaying a screen for setting a function of the device, the storage portion 18 for storing a program which includes data indicating the selected function and the setting value thereof and which is to be invoked and used, and the input portion (such as the touch panel portion 12) for receiving inputs of selection of the function and setting of the setting value of the selected function and inputs of registration of the program and invocation of the program, and the display portion performs such security protected display as to inhibit a predefined part of the contents of the registered program from being displayed as registered when the invoked program is displayed. With this configuration, when the program is used, it is possible to prevent the part indicating the information to be protected in view of information security such as personal information and classified information from being displayed as it is. Accordingly, it is possible to automatically prevent the information leakage. Further, it is possible to share a program with peace of mind. In addition, shared programs are easy to be increased, which can enhance the usability of the display input device (Operation panel 1).

Further, the display input device (Operation panel 1) includes the authentication portion (for example, the display control portion 10 and the primary control portion 8) for identifying the user based on the input. The storage portion 18 stores the registrant being the user who has registered the program in association with the program, and the display portion (liquid crystal display portion 11) performs the security protected display when the program is invoked by the person other than the registrant. When the registrant invokes the program, the information leakage may be ignored, and the security protected display is not performed, which allows the program to be used with the setting contents as registered. Further, when the person other than the registrant invokes the program, the security protected display is performed, which can prevent the information leakage.

Further, the input portion (such as the touch panel portion 12) receives the input relating to the transmission of data, and when the program in which the destination information on the transmission destination is set as the setting value is invoked, the display portion performs the security protected display that brings the destination information to the invisible state. While the data transmission requires the destination information because the transmission cannot be performed without the destination information, the display portion performs the security protected display that brings the destination information set as the predefined part to the invisible state. This inhibits the destination information from being displayed. Accordingly, it is possible to prevent the leakage of the personal information related to the destination. Further, the registrant can share the program including the destination information with peace of mind instead of having difficulties determining whether to share the program or avoid the sharing of the program from the viewpoint of prevention of the information leakage.

Further, when the program is invoked by the person other than the registrant, the storage portion 18 stores the new destination information input to the input portion (such as the touch panel portion 12) in place of the destination information in the invisible state and the user who has invoked the program in association with the invoked program. When the program is invoked by the user associated with the program, the display portion (liquid crystal display portion 11) displays the new destination information in place of the destination information set as the setting value. With this configuration, once the program is invoked and the destination information is input, the new destination information is automatically displayed next time the program is invoked and at the subsequent times. Accordingly, it becomes unnecessary for the user other than the registrant to input the destination every time, which can enhance the usability. Note that, the destination information is, for example, the address information and/or the destination name.

Further, the storage portion 18 stores the protection subject data D obtained by defining one or a plurality of protection subjects formed of characters, symbols, numerals, and/or a combination thereof as information whose leakage should be prevented. When the program including the protection subject as the setting value is invoked, the display portion (liquid crystal display portion 11) performs the security protected display that brings at least the part matched with the protection subject to the invisible state. This automatically inhibits the protection subjects (such as characters, symbols, and numerals) that should not be displayed in view of information security from being displayed, which can prevent the information leakage.

In the case of creating and transmitting an e-mail with the body, the title, and the like, the information to be protected in view of information security is often included in the e-mail. Therefore, when the program in which an e-mail transmission function is selected and which includes the protection subject in the contents of the e-mail is invoked, the display portion performs such security protected display that at least the part matched with the protection subject is displayed in an invisible manner. With this configuration, it is possible to positively inhibit the part included in the e-mail whose leakage should be prevented in view of information security from being displayed.

Further, the storage portion 18 stores the protection subject data D obtained by defining one or a plurality of protection subjects formed of characters, symbols, numerals, and/or a combination thereof as information whose leakage should be prevented. The display portion (liquid crystal display portion 11) displays the invocation screen S7 for selecting the program to be invoked and displaying at least one program name, and in the invocation screen S7, performs the security protected display that changes the program name including the part matched with the protection subject. With this configuration, the security protected display is also performed on the program name, which can prevent the information leakage. Accordingly, when performing the program registration, the user can assign the name with peace of mind without particular concern (without considering whether or not there is a problem in view of information security).

Further, the storage portion 18 stores the naming rule according to which the program name is changed by the security protected display. The display portion performs the security protected display by changing the program name according to the naming rule. This can prevent the personal information or the like from leaking out of the program name. Further, the program name is changed according to a fixed naming rule, and hence the contents of the program become easy to predict based on the changed name, which enables a desired program to be easily located.

Further, the input portion (such as the touch panel portion 12) receives an input that specifies any one of the registration date of the program, the registrant name, and the function name selected by the program or a combination of a plurality of items thereof as the naming rule. This allows the user to define the naming rule according to his/her preference, which can enhance a degree of freedom in the setting.

Further, the input portion (such as the touch panel portion 12) receives an input for adding and modifying the protection subject. The storage portion 18 updates the protection subject data D by the input for adding and modifying the protection subject. With this configuration, it is possible to define the protection subject in accordance with the use condition. Accordingly, it is possible to perform the security protected display without exception in accordance with the use condition.

Further, the input portion (such as the touch panel portion 12) receives a selection input for selecting whether or not to share the program. When the program selected to be shared is invoked, the display portion (liquid crystal display portion 11) performs the security protected display, and when the program selected not to be shared is invoked, displays the program only with respect to the registrant of the program. With this configuration, by invoking the program, the program protected display can be performed only when the leakage of the information to be protected occurs.

Further, there is a case where the number of users is small and the security protected display is not particularly necessary. Therefore, the input portion (such as the touch panel portion 12) receives a selection input for selecting whether or not to perform the security protected display, and the display portion (liquid crystal display portion 11) performs the security protected display when such selection as to perform the security protected display is performed. With this configuration, in accordance with the user's intention, the security protected display is performed only when necessary, which can enhance the usability of the display input device (Operation panel 1).

Further, the input portion (such as the touch panel portion 12) receives an input for selecting the function for which the security protected display is to be performed. The display portion (liquid crystal display portion 11) performs the security protected display for the selected function for which the security protected display is to be performed. With this configuration, in accordance with the user's intention, the security protected display is performed only for the function recognized to require the security protected display by the user, which can enhance the usability of the display input device (Operation panel 1).

Further, the image forming apparatus (multifunction peripheral 100) includes the display input device (Operation panel 1). It is possible to provide the image forming apparatus (multifunction peripheral 100) free from the leakage of the information to be protected in view of information security, such as the personal information or the classified information, which are displayed in the case of using the program related to the settings of the image forming apparatus (multifunction peripheral 100). It is possible to provide the image forming apparatus (multifunction peripheral 100) with high usability on which the program related to the settings of the image forming apparatus (multifunction peripheral 100) can be shared with peace of mind and usable programs are easy to be increased.

Next, another embodiment is described. Described in the above-mentioned embodiment is the example in which the storage portion 18 of the Operation panel 1 stores the image data on the screen displayed on the liquid crystal display portion 11, the program, the authentication information, the registrant, the new destination information, the protection subject data D, and the settings of the security protected display. However, those pieces of data may be stored in the storage portion 82 on the main body side. In this case, the storage portion 82 also functions as a storage portion of the Operation panel 1. The display control portion 10 communicates with the storage portion 82 to acquire or confirm the image data, the program, and the function name data.

Further described in the above-mentioned embodiment is the example in which the display control portion 10 controls the security protected display, performs a processing such as comparison, and grasps the setting contents of the program and the registrant. However, a part or the entirety of the processings describe to be performed by the display control portion 10 may be performed by the primary control portion 8. In this case, the primary control portion 8 also functions as a control portion of the Operation panel 1. For example, the primary control portion 8 communicates with the storage portion 18 or the storage portion 82 to acquire or confirm the data, and issues an instruction to the display control portion 10.

The embodiments of the present invention have been described, but the scope of the present invention is not limited thereto. The present invention may be implemented by making various modifications thereto without departing from the gist of the present invention.

What is claimed is:

1. A display input device, comprising:
   a storage portion for storing a program which comprises data indicating a selected function and a setting value thereof and which is to be invoked and used;
   an input portion for receiving inputs of selection of a function and setting of the setting value of the selected function and inputs of registration of the program and invocation of the program;
   an authentication portion for identifying a user based on the inputs; and
   a display portion for displaying a screen for setting the function of a device, and performing, when a program created and registered by another person is invoked, a security protected display so as to inhibit a predefined part of contents of the registered program from being displayed as registered, while displaying a setting screen related to the contents of the registered program, wherein
   the storage portion stores:
      a registrant being the user who has registered the program in association with the program,
      protection subject data obtained by defining one or a plurality of protection subjects formed of characters, symbols, numerals, and/or a combination thereof as information whose leakage is to be prevented, and
      a naming rule according to which a program name is changed by the security protected display,
   the display portion displays an invocation screen that displays at least one program name, for selecting the program to be invoked, and performs the security protected display that changes, out of program names corresponding to programs registered by a person other than an authenticated user, a program name having a part matched with the one or the plurality of protection subjects, and
   the input portion receives input relating to transmission of data, and wherein
   when the program in which destination information on a transmission destination is set as the setting value is invoked by a person other than the registrant, the display portion performs the security protected display that brings the destination information to an invisible state,
   when the program is invoked by the person other than the registrant, the storage portion stores, in association with the program for which a transmission job has been executed, new destination information input to the input portion in place of the destination information in the invisible state and the user who has invoked the program in association with the invoked program, and
   when the program is invoked by the user who is other than the registrant and is associated with the program, the display portion displays the new destination information in place of the destination information set as the setting value.

2. A display input device according to claim 1, wherein the destination information comprises address information and/or a destination name.

3. A display input device according to claim 1, wherein:
   the storage portion stores protection subject data obtained by defining one or a plurality of protection subjects formed of characters, symbols, numerals, and/or a combination thereof as information whose leakage is to be prevented; and
   when the program including the one or the plurality of protection subjects as the setting value is invoked, the display portion performs the security protected display that brings at least a part matched with the one or the plurality of protection subjects to an invisible state.

4. A display input device according to claim 3, wherein when the program in which an e-mail transmission function is selected and which includes the one or the plurality of protection subjects as contents of an e-mail is invoked, the display portion performs security protected display such that at least the part matched with the one or the plurality of protection subjects is displayed in an invisible manner.

5. A display input device according to claim 3, wherein:
   the input portion receives an input for adding and modifying the one or the plurality of protection subjects; and
   the storage portion updates the protection subject data by the input for adding and modifying the one or the plurality of protection subjects.

6. A display input device according to claim 1, wherein:
   the storage portion stores protection subject data obtained by defining one or a plurality of protection subjects formed of characters, symbols, numerals, and/or a combination thereof as information whose leakage is to be prevented; and
   the display portion displays an invocation screen that displays at least one program name of the program, for selecting the program to be invoked, and performs the security protected display that changes the at least one program name having a part matched with the one or plurality of protection. subjects on the invocation screen.

7. A display input device according to claim 6, wherein:
   the storage portion stores a naming rule according to which the at least one program name is changed by the security protected display; and
   the display portion performs the security protected display by changing the at least one program name according to the naming rule.

8. A display input device according to claim 1, wherein the input portion receives an input that specifies any one of a registration date of the program, a registrant name, and a function name selected by the program or a combination of a plurality of items thereof as the naming rule.

9. A display input device according to claim 1, wherein:
   the input portion receives an input for adding and modifying the one or the plurality of protection subjects; and
   the storage portion updates the protection subject data by the input for adding and modifying the one or the plurality of protection subjects.

10. A display input device according to claim 1, wherein:
   the input portion receives a selection input for selecting whether or not to share the program; and
   the display portion performs the security protected display when the program selected to be shared is invoked, and when the program selected not to be shared is invoked, displays the program only with respect to the registrant of the program.

11. A display input device according to claim 1, wherein:
the input portion receives a selection input for selecting whether or not to perform the security protected display; and
the display portion performs the security protected display when such selection as to perform security protected display is performed.

12. A display input device according to claim 1, wherein:
the input portion receives an input for selecting the function for which the security protected display is to be performed; and
the display portion performs the security protected display for the selected function for which the security protected display is to be performed.

13. An image forming apparatus, comprising the display input device according to claim 1.

14. A display method for a display input device, comprising:
storing a program which comprises data indicating a selected function and a setting value thereof and which is to be invoked and used;
receiving inputs of selection of a function and setting of the setting value of the selected function;
receiving inputs of registration of the program;
receiving inputs of invocation of the program;
identifying a user based on the inputs;
performing, when a program created and registered by another person is invoked, security protected display so as to inhibit a predefined part of contents of the registered program from being displayed as registered while displaying a setting screen related to the contents of the registered program, wherein
said storing a program stores:
a registrant being the user who has registered the program in association with the program,
protection subject data obtained by defining one or a plurality of protection subjects formed of characters, symbols, numerals, and/or a combination thereof as information whose leakage is to be prevented, and
a naming rule according to which a program name is changed by the security protected display,
said performing security protected display displays an invocation screen that displays at least one program name, for selecting the program to be invoked, and performs the security protected display that changes, out of program names corresponding to program registered by a person other than an authorized user, a program name having a part matched with the one or the plurality of protection subjects, wherein the display method further comprises
receiving inputs relating to transmission of data, and wherein
when the program in which destination information on a transmission destination is set as the setting value is invoked by a person other than the registrant, performing the security protected display to bring the destination information to an invisible state,
when the program is invoked by the person other than the registrant, storing, in association with the program for which a transmission job has been executed, new destination information input in place of the destination information in the invisible state and the user who has invoked the program in association with the invoked program, and
when the program is invoked by the user who is other than the registrant and is associated with the program, displaying the new destination information in place of the destination information set as the setting value.

* * * * *